(12) United States Patent
Bouchard et al.

(10) Patent No.: US 8,196,101 B1
(45) Date of Patent: Jun. 5, 2012

(54) REACH AND GET CAPABILITY IN A COMPUTING ENVIRONMENT

(75) Inventors: Ann M. Bouchard, Albuquerque, NM (US); Gordon C. Osbourn, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1426 days.

(21) Appl. No.: 11/738,574

(22) Filed: Apr. 23, 2007

(51) Int. Cl.
*G06F 9/45* (2006.01)

(52) U.S. Cl. ........................................ 717/120
(58) Field of Classification Search .................... 717/120
See application file for complete search history.

(56) References Cited

U.S. PATENT DOCUMENTS

| 6,957,415 | B1 | 10/2005 | Bouchard et al. | |
|---|---|---|---|---|
| 7,539,944 | B2 * | 5/2009 | Gauthier et al. | 715/748 |
| 2002/0065872 | A1 * | 5/2002 | Genske et al. | 709/202 |
| 2005/0240756 | A1 * | 10/2005 | Mayer | 713/2 |

OTHER PUBLICATIONS

Osbourn, Gordon C. et al., "Dynamic Self-Assembly of Hierarchical Software Structures/Systems", Sandia National Laboratories, Mar. 2003.
Bouchard, Ann M. et al., "Dynamic Self-Assembly and Computation: From Biological to Information Systems", Sandia National Laboratories, Physical and Chemical Sciences Center, Jan. 2004.
Bouchard, Ann et al., "Dynamic Self-Assembly as Computation: An Unconventional Approach to Software Implementation", Sandia National Laboratories, Mar. 21, 2007.
U.S. Appl. No. 10/456,115.
U.S. Appl. No. 11/527,002.
U.S. Appl. No. 11/527,100.
U.S. Appl. No. 11/670,709.

\* cited by examiner

*Primary Examiner* — John Chavis
(74) *Attorney, Agent, or Firm* — Blakely, Sokoloff, Taylor & Zafman; James Go; Kevin W. Bieg

(57) ABSTRACT

A reach and get technique includes invoking a reach command from a reach location within a computing environment. A user can then navigate to an object within the computing environment and invoke a get command on the object. In response to invoking the get command, the computing environment is automatically navigated back to the reach location and the object copied into the reach location.

30 Claims, 15 Drawing Sheets

HIGHLIGHTING SCREEN ELEMENTS

REACH AND GET CAPABILITY IN A COMPUTING ENVIRONMENT

This invention was made with Government support under Contract No. DE-AC04-94AL85000 between Sandia Corporation and the U.S. Department of Energy. The U.S. Government has certain rights in this invention.

TECHNICAL FIELD

This disclosure relates generally to software, and in particular but not exclusively, relates to a reach and get function within a computing environment.

BACKGROUND INFORMATION

Many hierarchical software systems are designed level-by-level using object-oriented designs that define the classes of objects of an application and their interrelationships. Associated with each class is a set of operations that can be performed on its objects, plus the set of object attributes. In the object-oriented design approach, code and data that belong together can be combined into objects. The objects are interconnected with each other within a level and to other levels. The objects are treated essentially as black-box modules that are utilized in various configurations to perform higher-level functions. The object-oriented designs can be used to form complex domains with layers or modules that can be interchangeable. Software architecture systems of enormous complexity can thus be formed. However, like most software systems, the object modules are actuated by direct calls from other modules and perform only designated and non-changeable functions. Data pathways between objects are predefined at compile time and immutable thereafter, unless the source code is modified and recompiled.

Due to the rigid nature of conventional object-oriented programming ("OOP"), the users of software products created using conventional OOP techniques cannot easily modify the underlying software and data pathways. Rather, if a group of users all have a common need, they often must lobby the publisher for their desired feature, and wait for the next software product installment before a new feature addressing the need is incorporated by the publisher.

Microsoft Windows Operating System ("OS"), Microsoft Office, Apple OS, and Linux OS are examples of computing environments that are fixed at compile time and relatively immutable by the user at runtime. Microsoft Windows OS and Apple OS both use graphical user interfaces ("GUIs") that are fixed at compile time and therefore generally immutable by the user (notwithstanding user defined configuration selections).

Although both these software products rely extensively on GUIs, they still require a relatively tech-savvy user who understands hierarchical file structures to access, modify, create, and delete user files and data. For users that are unfamiliar with hierarchical file structures, using these software packages can be frustrating and intimidating. On the other hand, for advanced tech-savvy users, the inability to modify these software packages after compile time can also be frustrating.

A common feature that is supported by the operating systems listed above is the copy and paste function. This feature allows a user to copy data from one location and paste it into another location. If a user is working on a TABLE A and wishes to copy data from a TABLE B into TABLE A, the user must first navigate to TABLE B, select the specific data, copy the data, navigate back to TABLE A, and then paste the copied data into the desired location. The acts of copying and pasting themselves are quick and can be as simple as pressing CTRL-C to copy and CTRL-V to paste. However, the most time consuming aspect of the copy and paste feature is the time spent navigating to TABLE B and then navigating back to TABLE A.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for implementing a reach and get function within a computing environment are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
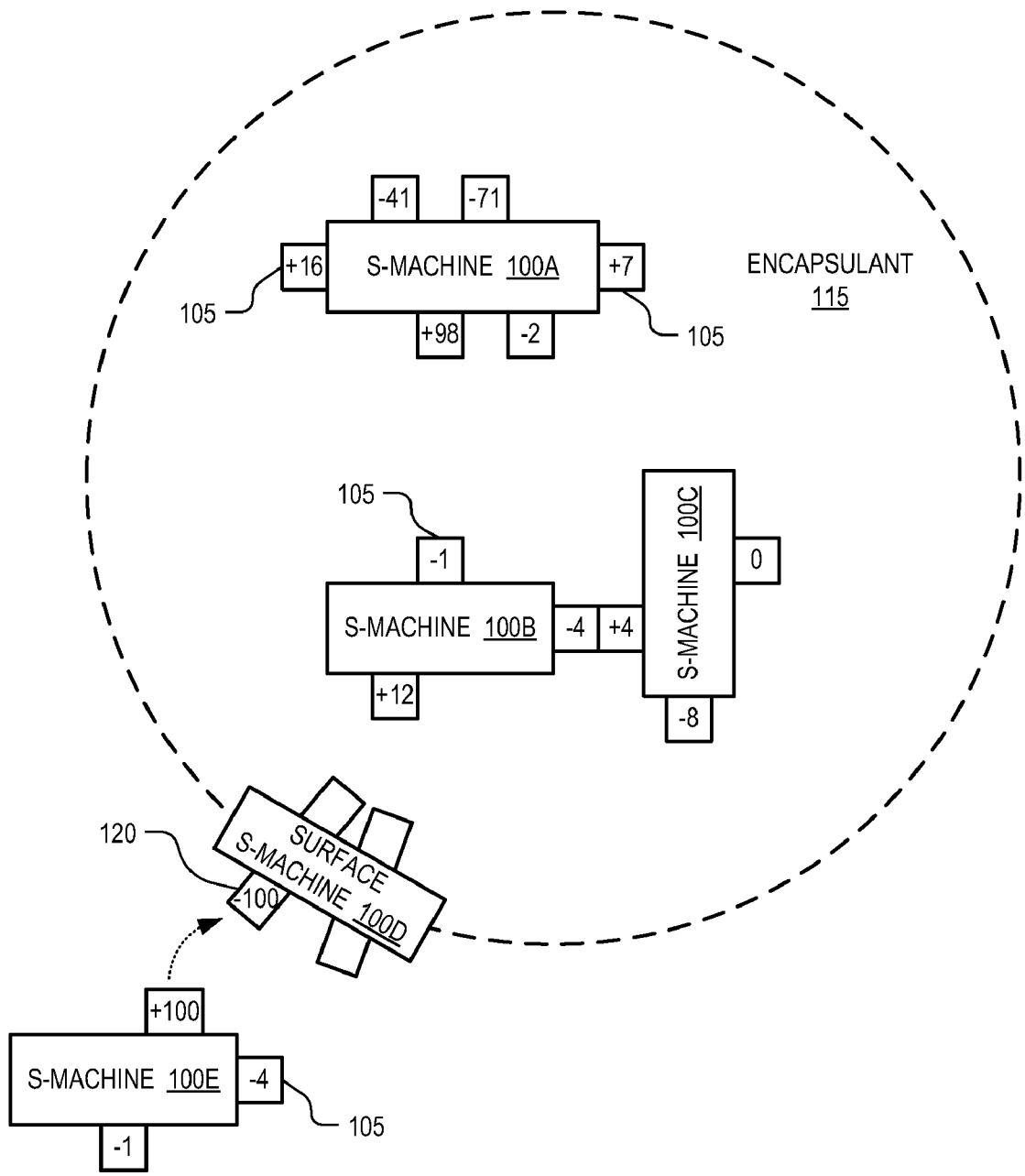
FIG. 1 is a block diagram illustrating self-assembling s-machines grouped in an encapsulated environment, in accordance with an embodiment of the invention.

FIG. 1 is a block diagram illustrating a software virtual environment including software entities termed "software-machines" or "s-machines" 100A-100E (collectively s-machines 100), in accordance with an embodiment of the invention. Each s-machine 100 is capable of executing a function, which can be simple (such as adding two numbers) or complex (such as reading a complex formatted file from the hard disk). Each s-machine 100 includes one or more of a data storage element to store data, an actuating element to execute commands, or a control element to control activation of the s-machine in response to a stimulus.

S-machines 100 are capable of self-assembling or self-organizing by binding or linking to each other to form a larger s-machine complex capable of executing higher level complex tasks. For example, multiple s-machines 100 may be created, one capable of summing two operands, one capable of subtracting one operand from another, one capable of multiplying two operands, and yet another capable of dividing one operand into another operand. The s-machines capable of implementing these simple mathematical functions may then bind together with one or more other s-machines capable of generating a graphical user interface ("GUI"). By self-organizing into a more complex structure, these simple s-machines can create a graphical calculator. Since self-organizing is executed during runtime, additional s-machines capable of other mathematical functions can be created and joined with the existing s-machines of the calculator group to extend the functionality of the calculator during runtime, after compile time. In this manner, s-machines 100 are capable of generating a real-time, user-adaptable, computing environment.

S-machines 100 self-assemble using binding sites 105 (only a portion are labeled so as not to clutter the drawing). Each s-machine 100 may include one or more binding sites 105 that can remain concealed pending the occurrence of prerequisite conditions, at which time the concealed binding site exposes itself to other s-machines 100. In some cases, the act of binding itself is the prerequisite or stimulus for exposing another concealed binding site. Each binding site 105 is associated with a key and can stochastically or deterministically bind to another exposed binding site on a different s-machine 100 having a complementary key or other key pair association framework. S-machines 100 make and break bonds formed between complementary binding sites 105 in due course during runtime. In one embodiment, when binding sites of two s-machines 100 are linked, the two sites have pointers pointing to each other. This provides a data pathway between the two s-machines, enabling the s-machines to access each other's data, pass data to each other, or send commands to each other. These bonds may be short-lived or long-lived. The act of binding/unbinding (also referred to linking/unlinking or coupling/decoupling) may be the stimulus to cause one or more internal actuation elements of an s-machine 100 to execute. A signal (whether data-passing or not) sent from one s-machine to a bound s-machine may also be the stimulus to cause internal actuation elements of one or both s-machines 100 to execute. In other cases, other stimulus may cause an s-machine 100 to execute its actuation element(s).

S-machines 100 can self-organize into hierarchical data structures having limited scope. For example, surface s-machine 100D may function as an interface to encapsulant 115 to limit the scope of s-machines 100A-100C contained within encapsulant 115. Encapsulant 115 acts as a sort of virtual environment of limited scope where s-machines 100 within this virtual environment form some application, function, or process.

Surface s-machine 100D can operate as a sort of gate keeper allowing s-machines to enter or exit encapsulant 115. In this role, surface s-machine 100D has a key associated with a binding site 120 and any s-machine 100 wishing to pass through the virtual encapsulant surface must have a complementary key. Alternatively, surface s-machine 100D can operate as a signal transducer across the encapsulant surface. In that role, when an external s-machine having a complementary key binds to binding site 120, this stimulates surface s-machine 100D to expose a site internal to the encapsulant, which can trigger the execution of some internal task by binding to a control site of an internal s-machine. Encapsulant 115 effectively creates a local environment in which collections of free binding sites 105 can interact without interference from the outside world. S-machines 100 encapsulated within encapsulant 115 can reuse binding keys already in use by other s-machines outside of encapsulant 115 without establishing bonds thereto. It should be appreciated that encapsulant 115 is not necessarily intended to connote a literal barrier formed around the internal s-machines 100A, 100B, 100C, but rather a functional barrier that computationally isolates the internal s-machines 100A, 100B, and 100C in some manner from external s-machine 100E.

In one embodiment, the virtual environment created by s-machines 100 and encapsulant 115 is a biologically inspired software architecture. S-machines 100 are analogous to proteins, which operate as molecular machines. S-machines 100 self-assemble via binding/unbinding events in a dynamic manner similar to continually reconfiguring proteins. As mentioned, the bonds between s-machines 100 can be long lived, analogous to strong covalent bonds, or fleeting, analogous to weak protein-protein bonds. Encapsulant 115 resembles a biological cell membrane that isolates its internal contents from bonding interactions with external structures. Surface s-machine 100D, itself, is analogous to membrane proteins in biological cells. Some surface s-machines, termed "gates", correspond to channel proteins, allowing passage of other entities (s-machines or encapsulants) into or out of the encapsulant. Other surface s-machines may correspond to signal or receptor proteins capable of communicating signals without transporting any s-machines into or out of an encapsulant.

Figure 2:
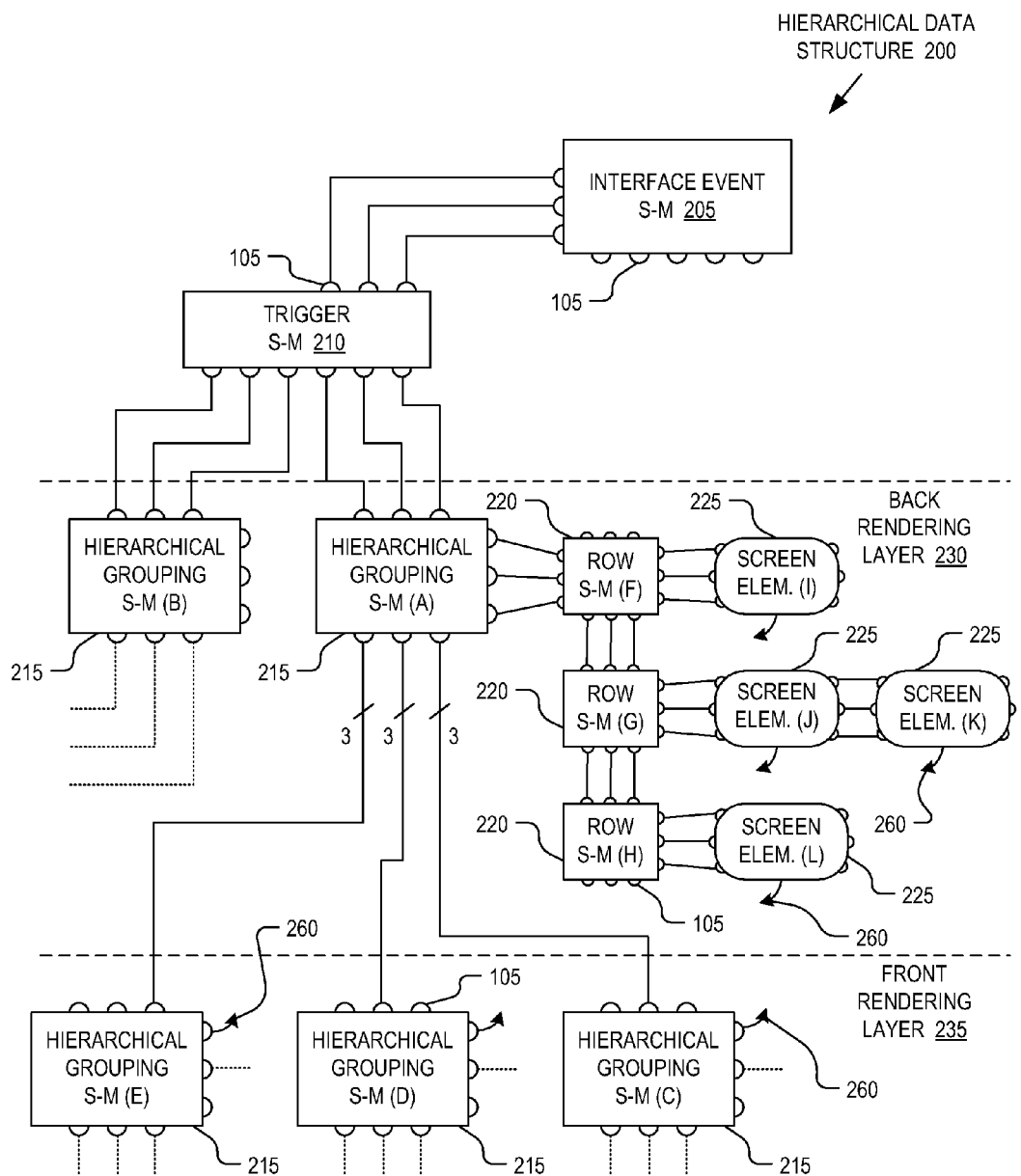
FIG. 2 is a block diagram illustrating a hierarchical data structure for controlling and rendering images to a display screen, in accordance with an embodiment of the invention.

FIG. 2 is a block diagram illustrating a hierarchical data structure 200 including s-machines for rendering and interacting with screen elements, in accordance with an embodiment of the invention. The illustrated embodiment of hierarchical data structure 200 includes an interface event s-machine 205, a trigger s-machine 210, hierarchical grouping s-machines 215, row rendering s-machines 220, and screen element s-machines 225. The s-machines dynamically self-organize into hierarchical data structure 200 by matching complementary binding keys associated with their binding sites 105 (only a portion are labeled), as discussed above.

Figure 3:
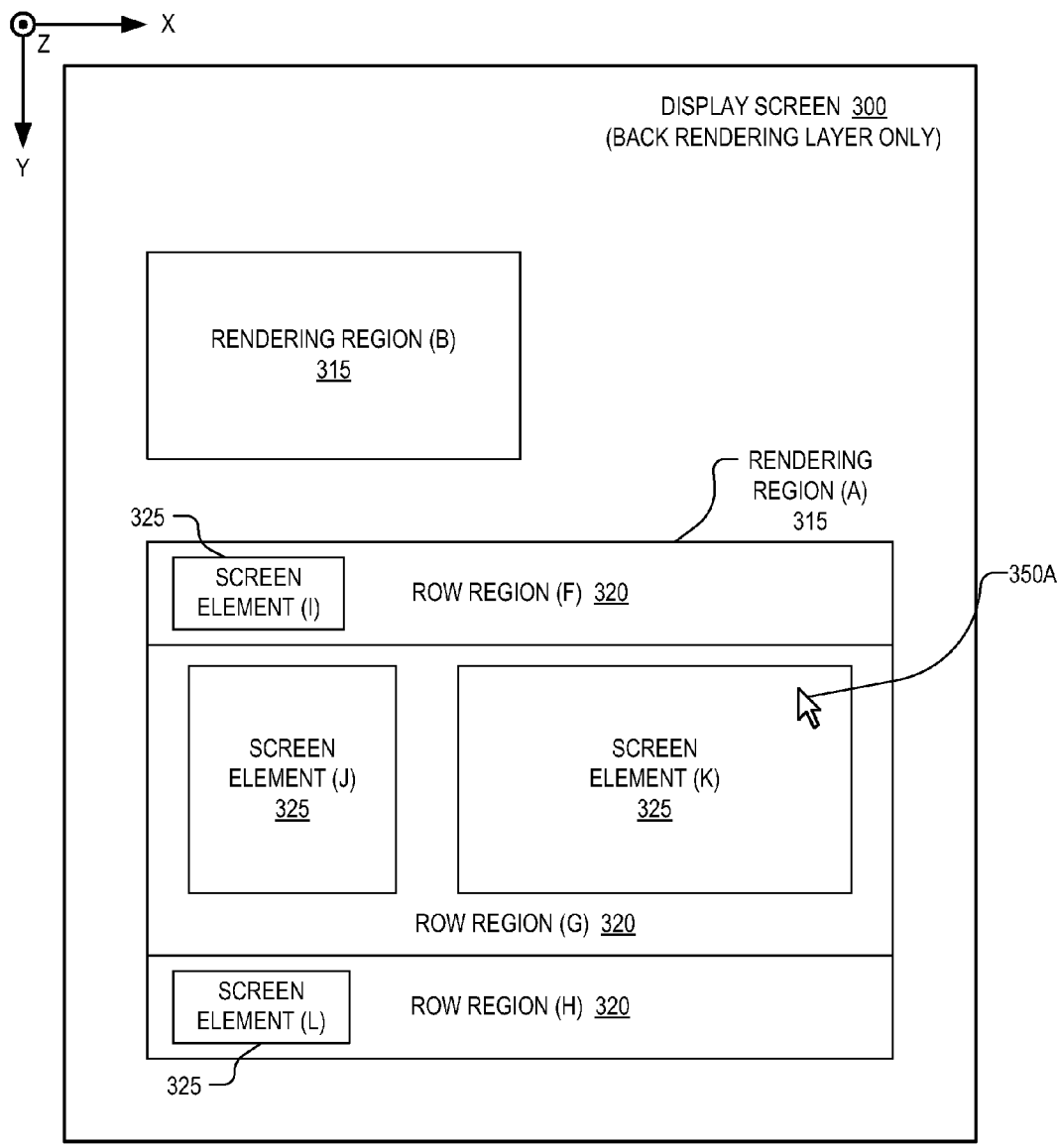
FIG. 3 is a block diagram illustrating a display screen with multiple rendering regions, row regions, and screen elements, in accordance with an embodiment of the invention.

FIG. 3 illustrates an example display screen 300 including screen elements rendered by hierarchical data structure 200. FIG. 3 only illustrates a single rendering layer, corresponding to a back rendering layer, while multiple front rendering layers (not illustrated) may be rendered directly in front of, and therefore partially conceal, the back rendering layer.

Each hierarchical grouping s-machine 215 is associated with a corresponding rendering region 315 (e.g., hierarchical grouping s-machine (A)→rendering region (A), hierarchical grouping s-machine (B)→rendering region (B), etc.). Each row rendering s-machine 220 is associated with a corresponding row region 320 (e.g., row rendering s-machine (F)→row region (F), row rendering s-machine (G)→row region (G), etc.). Similarly, each screen element s-machine 225 is associated with a corresponding screen element 325 (e.g., screen element s-machine (J)→screen element (J), screen element s-machine (L)→screen element (L), etc.).

Hierarchical grouping s-machines 215, row rendering s-machines 220, and screen element s-machines 225 are organized into a hierarchy where vertically bound hierarchical grouping s-machines 215 connote successive rendering layers. Since hierarchical grouping s-machines (A) and (B) are both bound within hierarchical data structure 200 at the same rendering layer (i.e., back rendering layer 230), they group row rendering s-machines 220 and screen element s-machines 225 responsible for rendering screen elements 325 on the same rendering layer. In contrast, hierarchical grouping s-machines (C), (D), and (E) are bound below hierarchical grouping s-machine (A), and therefore group row rendering s-machines and screen element s-machines responsible for rendering screen elements at a front rendering layer 235 that is in front of or overlays back rendering layer 230 (i.e., front rendering layer 235 has a greater value in the z-axis than back rendering layer 230, see FIG. 3). Furthermore, since hierarchical grouping s-machines (C), (D), and (E) are all bound below hierarchical grouping s-machine (A), these s-machines will correspond to rendering regions that have the same or smaller x-y dimensions as rendering region (A) of hierarchical grouping s-machine (A), but will be bounded by the x-y coordinates of rendering region (A), and therefore reside in front of at least a portion of rendering region (A).

In one embodiment, screen element s-machines 225 include data or pointers to data for generating each screen element 325 rendered to display screen 300. For example, screen element s-machines 225 may provide the data used to render an image, text, blank region, or any other object to display screen 300.

One or more screen element s-machines 225 may link in series from a single row rendering s-machine 220. In one embodiment, row rendering s-machines 220 include functionality for rendering each screen element 325 included within its associated row region 320 to display screen 300 with reference to data provided by the corresponding screen element s-machine 225. It should be appreciated that in other embodiments, the functionality for rendering screen elements 325 may be embedded within screen element s-machines 225 themselves or hierarchical grouping s-machines 215.

In one embodiment, interface event s-machine 205 includes functionality for tracking the movement of a pointing cursor 350A (see FIG. 3) and may include knowledge of the x-y coordinates of cursor 350A, the relative motion of cursor 350A from one spot on display screen 300 to another, the velocity of cursor 350A, or otherwise. Interface event s-machine 205 may further poll external input/output ("I/O") devices (e.g., key board, mouse, etc.) for events associated with the current location of cursor 350A (e.g., key strokes, scroll wheel movement, mouse clicks, etc.).

Trigger s-machine 210 is bound between interface event s-machine 205 and hierarchical grouping s-machines at the back rendering layer (e.g., hierarchical grouping s-machines (A) and (B) at back rendering layer 230). In one embodiment, trigger s-machine 210 receives the current x-y coordinates of cursor 350A and sends a signal with the x-y coordinates to the hierarchical grouping s-machines (A) and (B). Hierarchical grouping s-machines (A) and (B) determine whether cursor 350A currently resides over any portion of their corresponding rendering region 315. If it does, hierarchical grouping s-machines 215 will pass this signal on to successive hierarchical grouping s-machines bound below. In FIG. 2, if hierarchical grouping s-machine (A) determined that the cursor 350A resides over its rendering region, it would pass the x-y coordinate signal to hierarchical grouping s-machines (C), (D), and (E). The lowest hierarchical grouping s-machine in the hierarchy (corresponding to the front-most rendering layer) that determines that the cursor 350A resides over its rendering region will also forward the x-y coordinate signal on to its attached row rendering s-machines 220 and screen element s-machines 225 to determine over which screen element 325 cursor 350A currently resides. When a particular screen element s-machine 225 determines that cursor 350A currently resides over its corresponding screen element 325, the particular screen element s-machine 225 becomes the "owner" of the cursor 350A. The screen element s-machine 225 that owns the cursor 350A will expose new binding sites 105 to establish new event pathways (discussed in greater detail below in connection with FIGS. 4 and 5). It should be appreciated that in other embodiments, the functionality for determining which screen element s-machine 225 owns the cursor 350A may be embedded within the row rendering s-machines 220 or the hierarchical grouping s-machines 215.

Trigger s-machine 210 may further be capable of issuing render signals to the lower hierarchy of hierarchical data structure 200 to signal each s-machine to re-execute its rendering instructions (e.g., OpenGL commands, DirectX commands, or the like). Trigger s-machine 210 may further be capable of signaling the lower hierarchy that display screen 300 has changed (e.g., user dragged a screen element to a new screen location) and that each s-machine should update itself and render accordingly. Although FIG. 2 illustrates three bonds between each s-machine within hierarchical data structure 200 (one for each of the rendering, screen pointer x-y coordinate, and update signals) it should be appreciated that more or less such bonds may be established between the s-machines.

The illustrated embodiment of hierarchical data structure 200 further illustrates links 260 for establishing communication pathways between screen element s-machines 225 and hierarchical grouping s-machines 215. For example, a particular screen element s-machine 225 may establish a link 260 with one or more hierarchical grouping s-machines 215 that correspond to rendering regions 315 that reside directly in front of, at the next rendering layer forward, the corresponding screen element 325 of the particular screen element s-machine 225. Links 260 enable the back rendering layer screen element s-machines 225 to signal the bound-to hierarchical grouping s-machines 215 (which render the next rendering layer forward) to detach from hierarchical data structure 200. Upper rendering layer hierarchical grouping s-machines 215 may detach from hierarchical data structure 200 so that other hierarchical grouping s-machines 215 can attach to change the image rendered to display screen 300. The attachment and detachment of hierarchical grouping s-machines 215 is discussed in further detail below in connection with FIGS. 10, 11, and 12.

Figure 4:
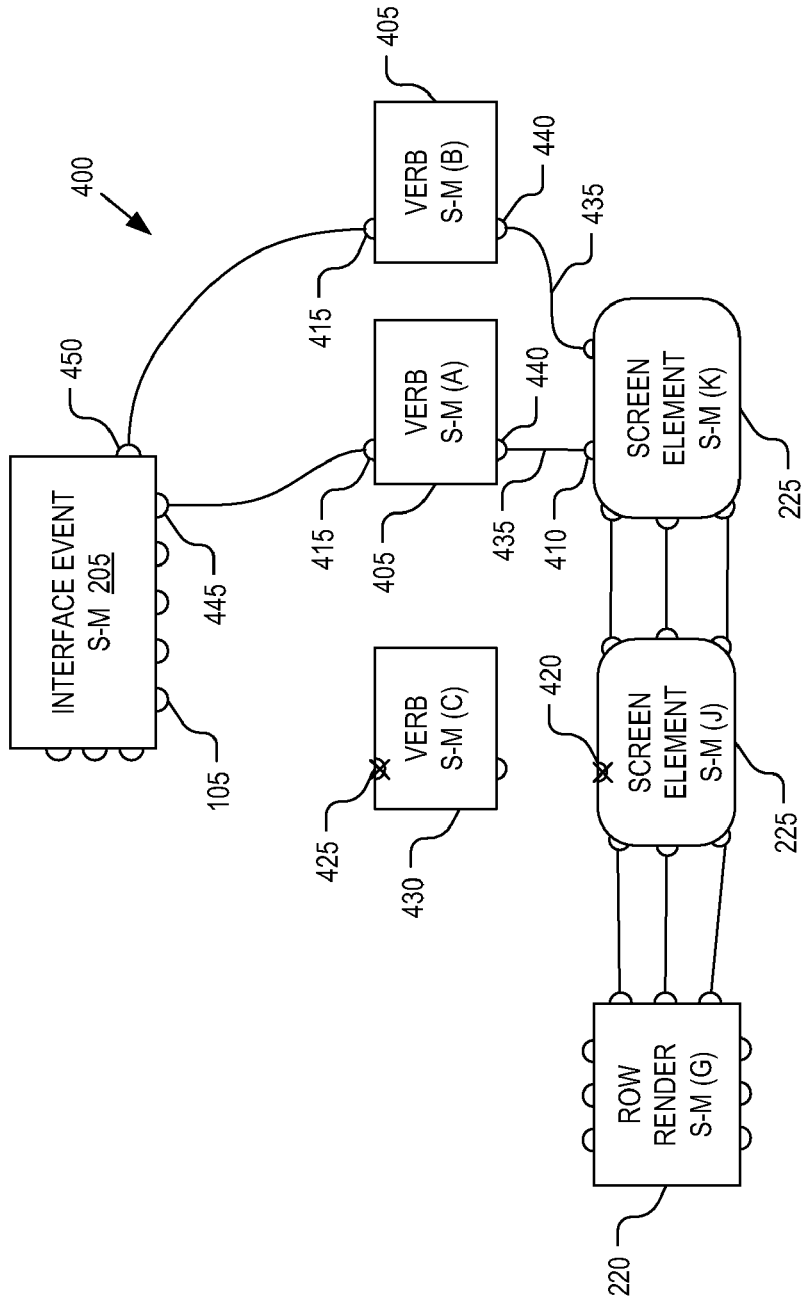
FIG. 4 is a block diagram illustrating self-assembly of an event pathway between an interface event s-machine, a verb s-machine, and a screen element s-machine, in accordance with an embodiment of the invention.

FIG. 4 is a block diagram illustrating self-assembly of an event pathway 400, in accordance with an embodiment of the invention. Event pathway 400 links interface event s-machine 205 to screen element (K) via a verb s-machine 405. Event pathway 400 is created in real-time in response to a specific event or set of events. Verb s-machine 405 is a special type of s-machine 100 that binds to other s-machines 100 to implement functions and take "actions" associated with the bound-to s-machine 100. In the present example, verb s-machines bind to screen element s-machines 225 to execute actions associated with their corresponding screen elements 325.

For example, event pathway 400 may be created in response to passing cursor 350A over screen element (K). For the sake of discussion, if screen element (K) is a text area rendered to display screen 300, then positioning cursor 350A over screen element (K) and left "clicking" a mouse button may insert a cursor within the text, putting the text area into edit mode. Additionally, positioning cursor 350A over screen element (K) and then pressing the left mouse button down and dragging may select and highlight text. The functionality of initiating text editing and selecting text may be implemented by verb s-machines 405, as described below.

Figure 5:
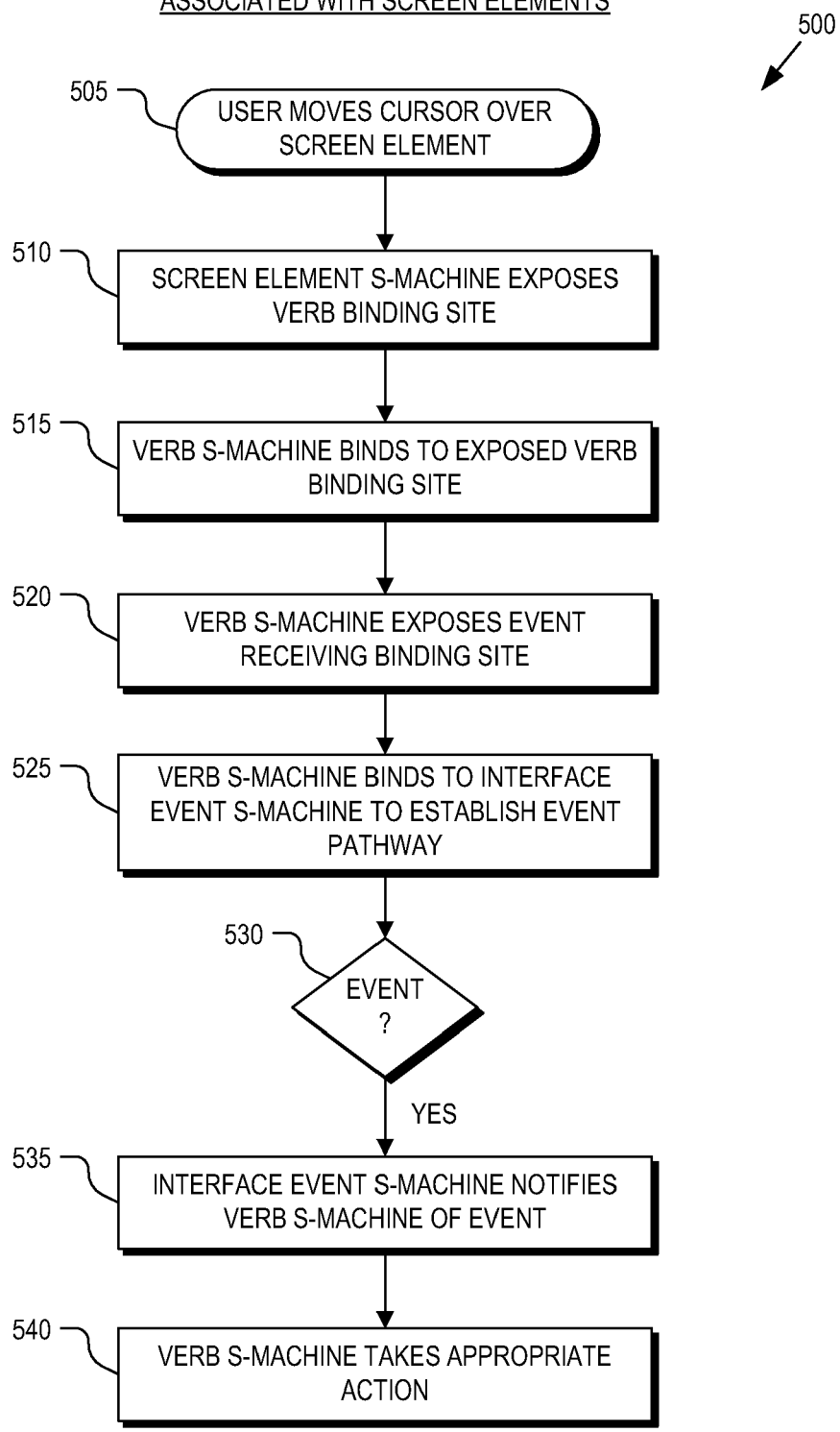
FIG. 5 is a flow chart illustrating a process to self-assemble event pathways associated with screen elements to implement various functionality associated with the screen elements, in accordance with an embodiment of the invention.

FIG. 5 is a flow chart illustrating a process 500 to self-assemble event pathway 400 associated with screen element (K) to implement various functionalities associated with screen element (K), in accordance with an embodiment of the invention. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, a user moves cursor 350A over screen element (K). In a process block 510, screen element s-machine (K) exposes one or more verb binding sites 410 in response to cursor 350A. In one embodiment, screen element s-machine (K) exposes verb binding site 410 in response to a signal issued by trigger s-machine 210, and propagated by hierarchical grouping s-machines 215, as to which screen element s-machine 225 owns cursor 350A. Since in the illustrated embodiment of FIG. 3, cursor 350A is residing over screen element (K), screen element s-machine (K) responds by exposing one or more verb binding sites 410. Since the text area represented by screen element s-machine (K) can respond to left-mouse-click events (initiating text editing) and left-mouse-down-and-drag events (selecting text), screen element s-machine (K) will expose two verb binding sites 410, with binding site keys complementary to the binding site keys 440 of two different verb s-machines (A) and (B). Verb s-machine (A) embeds the functionality of responding to left-mouse-click events by initiating text editing. Verb s-machine (B) embeds the functionality of responding to left-mouse-down-and-drag events by selecting text.

In a process block 515, verb s-machines 405 (A) and (B) bind to exposed verb binding sites 410 to create temporary bonds 435 that last as long as the user maintains cursor 350A over screen element (K). In a process block 520, verb s-machines 405 that are bound to screen element s-machine (K) expose an event receiving binding site 415. Event receiving binding site 415 is exposed in response to verb s-machine 405 binding to screen element s-machine (K). The key of binding site 415 of verb s-machine (A) is complementary to that of the binding site 445 of interface event s-machine 205 associated with left-mouse-click events. The key of binding site 415 of verb s-machine (B) is complementary to that of the binding site 450 of interface event s-machine 205 associated with left-mouse-down-and-drag events. Upon exposing event receiving binding site 415, verb s-machines (A) and (B) 405 bind to interface event s-machine 205 (process block 525). At this point, one or more event pathways 400 are established and ready to service events associated with screen element (K). In this example, two event pathways 400 are established, one associated with left-mouse-click events and one associated with left-mouse-down-and-drag events.

Interface event s-machine 205 may be constantly polling for a variety of different types of events, such as a left mouse click, left-mouse-down-and-drag, a key stroke, a scroll wheel action, a cursor navigation action, or otherwise. Interface event s-machine 205 may have a binding site 105 associated with each such event type, each with a different key. In a decision block 530, if an event of a type associated with a bound binding site 105 of interface event s-machine 205 occurs, then the event is valid, and the process 500 continues to a process block 535. If an event occurs for which interface event s-machine 205 has no bound event pathway, the event is invalid and no action is taken. Events can be categorized into event types based on a variety of factors including location of a cursor on a display screen, the current state of a computing environment (e.g., is a document/virtual book open, what application is currently being accessed, etc.), and whether the user input is a mouse click, a key stroke, a scroll wheel action, a cursor navigation, or otherwise.

Upon the occurrence of a valid event (decision block 530), interface event s-machine 205 sends a signal through the binding site 105 associated with the event type. This signals the appropriate verb s-machine 405 of the event occurrence along event pathway 400 (process block 535). Finally, in a process block 540, the signaled verb s-machine 405 takes the appropriate action in response to the specific event. For example, if the interface event was a left mouse click, verb s-machine (A) 405 would be signaled, and respond by rendering a cursor in the x-y location of the screen pointer and putting the text in editing mode. It should be appreciated that embodiments of verb s-machines 405 are not limited to binding to screen element s-machines 225 for initiating text editing or selecting text, but rather may bind to a row rendering s-machines 220 or hierarchical grouping s-machines 215 to implement a variety of actions in response to a variety of events.

Returning to FIGS. 3 and 4, cursor 350A is not currently residing over a screen element (J) 325. Therefore, verb binding site 420 of screen element s-machine (J) 225 is internally hidden. Correspondingly, event receiving binding site 425 of verb s-machine 430 is also hidden, since verb s-machine 430 is not currently bound to any screen element s-machine. For the sake of discussion, suppose screen element (J) 325 corresponds to a button, and verb s-machine (C) 430 responds to left-mouse-click events by displaying an image. If the cursor 350A were moved over screen element (J) 325, the bonds between interface event s-machine 205, verb s-machines (A) and (B) 405, and screen element s-machine (K) 225 would all be broken, to be replaced by bonds between screen element s-machine (J) 225, verb s-machine (C) 430, and interface event s-machine 205 in the same manner as described above. Since verb s-machine (C) 430 responds to left-mouse-click events, it would bind to the very same binding site 445 of interface event s-machine 205 that had previously been bound to verb s-machine (A) 405. Thus, many verb s-machines, all responding to the same event type, can bind, one at a time, to the same binding site on interface event s-machine 205. Further, verb s-machines serve as a means of specializing the response to a generic interface event (such as left-mouse-click) to the context of the screen element s-machine to which it is bound. It should be appreciated that in other embodiments, the functionality of specializing the response to generic interface events may be embedded in the screen element s-machines 225 themselves, rather than separate verb s-machines.

Figure 6:
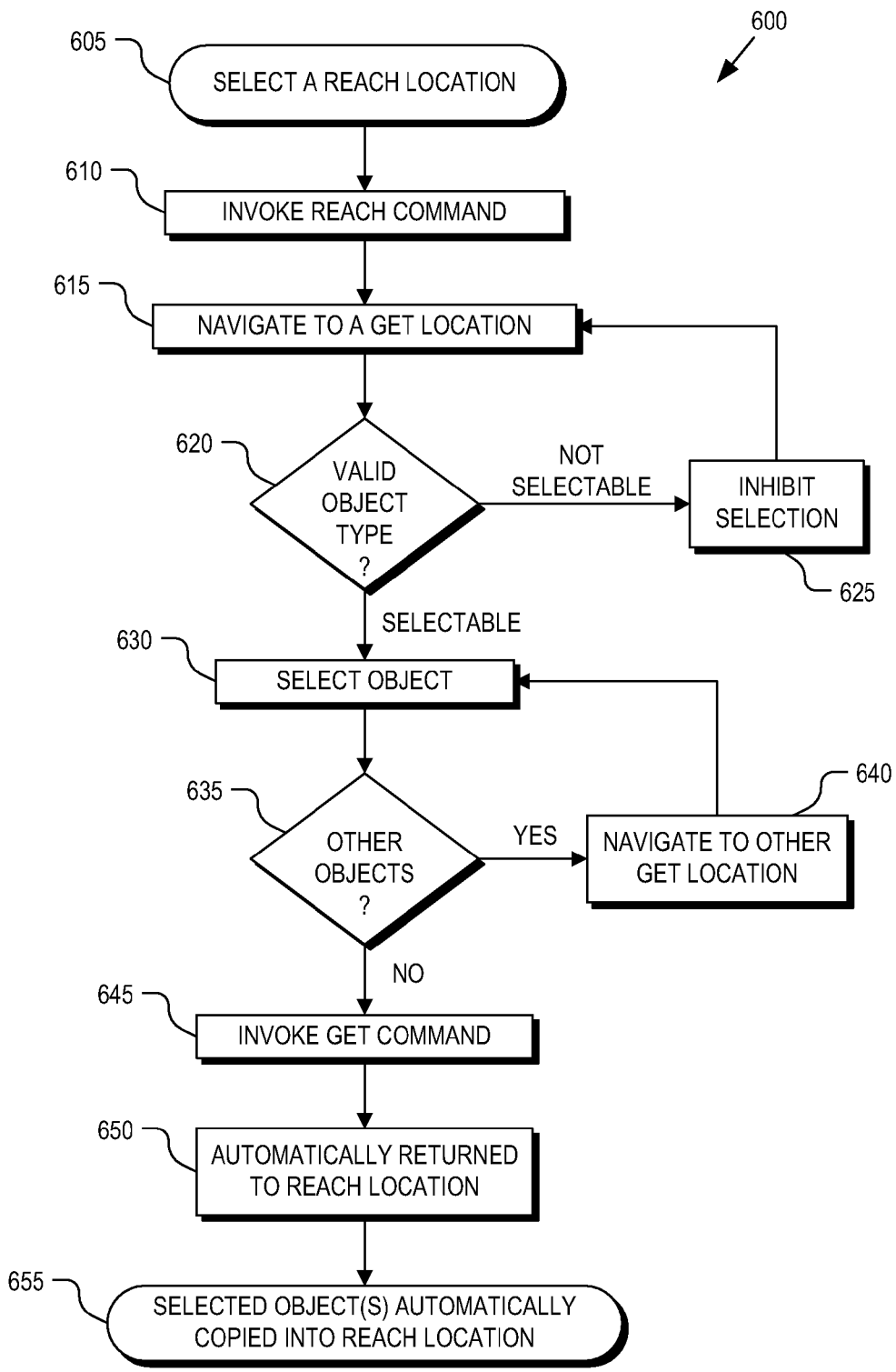
FIG. 6 is a flow chart illustrating a process to reach and get objects within a computing environment, in accordance with an embodiment of the invention.

FIG. 6 is a flow chart illustrating a process 600 to reach and get objects within a computing environment, in accordance with an embodiment of the invention. The reach and get technique described in connection with process 600 may supplant the traditional copy and paste functions within a given computing environment, or supplement the copy and paste functions as a time saving alternative. Process 600 illustrates the reach and get functions in general, while a process 1100 discussed below (see FIG. 11) illustrates how the reach and get functions may be implemented using self-organizing s-machines. The order in which some or all of the process blocks appear in processes 600 and 1100 should not be deemed limiting. Rather, one of ordinary skill in the art having the benefit of the present disclosure will understand that some of the process blocks may be executed in a variety of orders not illustrated, or event in parallel.

Figures 7A, 7B:
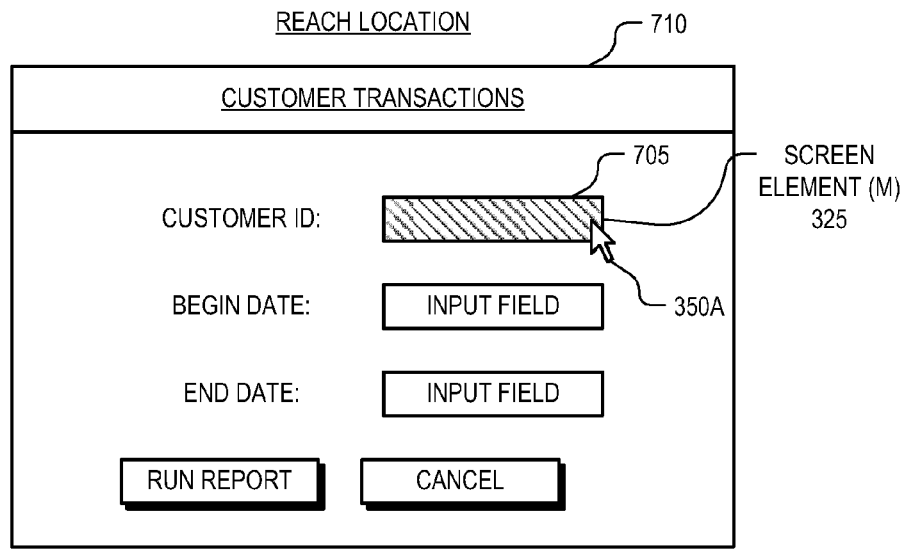
FIG. 7A is an illustration of a reach location, in accordance with an embodiment of the invention.
FIG. 7B is an illustration of a get location, in accordance with an embodiment of the invention.

In a process block 605, a reach location within a computing environment is selected. The reach location is the location into which a user desires to copy/move an object (e.g., alphabetical text, numerical text, alphanumerical data, images, tables, plots, etc.) grabbed from a remote location within the computing environment. The reach location may be the current location of a text editor cursor, the current location of a mouse cursor, an input field of a dialog box, or otherwise. FIG. 7A illustrates an input field 705 of a dialog box 710 as an example reach location. Dialog box 710 and input field 705 may be rendered using a hierarchical data structure similar to hierarchical data structure 200. In the illustrated embodiment, the reach location is a screen element (M) 325 rendered by a corresponding screen element s-machine (M) 225 (see FIG. 9A).

Once a reach location has been selected, the user can invoke a reach command to enter the computing environment into a reach mode. The reach command may be invoked any number of ways including via a popup menu accessed with a right mouse click or a key stroke combination (e.g., ALT-R) (process block 610). After invoking the reach command, the user can actively "reach" or navigate a mouse cursor or text cursor to an object that is to be copied into the reach location (process block 615). As mentioned, the object may be remotely located at a "get location." The get location may be another location within the same document, book, or application as the reach location, or may be located in another document, book, application, either on the same computer or a network attached drive or computer, or otherwise. FIG. 7B illustrates an object (e.g., numerical value "12345") stored at the get location (e.g., table entry in column 1, row 1 of a table 720 within a virtual book 725) as the object to be grabbed and copied into the reach location. Virtual book 725 and table 720 may be rendered using a hierarchical data structure similar to hierarchical data structure 200. In the illustrated embodiment, the get location is a screen element (N) 325 rendered by a corresponding screen element s-machine (N) 225 (see FIG. 8A).

In a process block 620, when navigating to "get" an object, embodiments of the invention will determine whether an object over which the cursor is hovering is permissible to copy into the reach location. In other words, the data type category of screen element (N) is analyzed to determine whether it corresponds to a permissible data type category (ies) of screen element (M). If the data type category of the object at the get location is invalid or not permitted, then the user is inhibited from "grabbing" or selecting the object (process block 625). If the object at the get location matches allowable data type categories for the reach location, then the user is permitted to "select" the object (process block 630).

For example, if input field 705 (designated as the reach location) only permits customer identifiers ("IDs") that are numerical values, then attempting to select a screen element while in the reach mode that includes alphabetical text or images would be inhibited. Other data type categories may include integers, strings, various measurement units (e.g., distance, area, volume, speed, acceleration, currency, etc.), or other more specialized subcategories, such as principle, interest, salary, etc. If a reach location is assigned to a particular subcategory, such as interest, then if the user reaches for a dollar value residing in a principle only column of a table, the user could be inhibited from erroneously grabbing principle values. This intelligent or smart reach mode helps the user find a desired object, while at the same time reducing the user's likelihood of mistakenly grabbing the wrong object. It should be further appreciated that some screen elements may have no units associated with them, and as such, their selection is not inhibited. Examples of such unitless screen elements are screen elements for accessing applications, accessing menus, or otherwise navigating throughout the computing environment.

Embodiments of the invention further support a multi-grab function that permits a user to reach and get multiple objects. For example, the user may select multiple fields within a table as the reach location and then reach for multiple objects within another table to copy into the multiple corresponding fields at the reach location. For example, a user may select all three input fields illustrated in FIG. 7A by left clicking on each input field while holding the CTRL key. In a decision block 635, if the user wishes to get multiple objects, then the user simply navigates to the other object(s) (process block 640) and invokes a multi-select command (process block 630) on the other objects. In one embodiment, the multi-select command may be invoked by holding the CTRL key, or other key, while selecting the object with a mouse click. Alternatively, the multi-select function may be invoked via a popup menu selection. The additional objects may similarly be subject to selection inhibition if their data types are invalid.

Once all objects have been selected (decision block 635), the user can invoke a get command (process block 645) upon the selected objects at the get location. The get command may be invoked a number of different ways including via a popup menu or key stroke combination (e.g., CTRL-G). Invocation of the get command automatically returns the computing environment to the reach location (process block 650) and copies the selected object(s) into the reach location (process block 655), and exits the computing environment from the reach mode.

In the example of FIGS. 7A and 7B, customer ID "12345" would be copied into screen element (M) and the cursor returned to the reach location just prior to invoking the reach command. In one embodiment, cursor 350A is transformed from a pointer to a reaching hand cursor 350B upon invocation of the reach command to visually indicate to a user than the reach mode has been entered and to symbolize the act of reaching to get an object. Upon exiting the reach mode by invoking the get command, the reaching hand cursor 350B transforms back to the pointing cursor 350A.

Figure 8A:
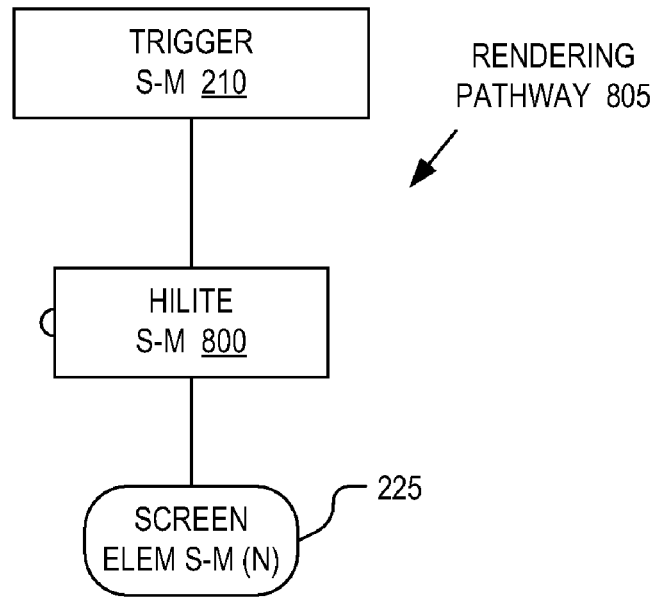
FIG. 8A is a functional block diagram illustrating a rendering pathway including a hilite s-machine for highlighting screen elements, in accordance with an embodiment of the invention.
Figure 8B:
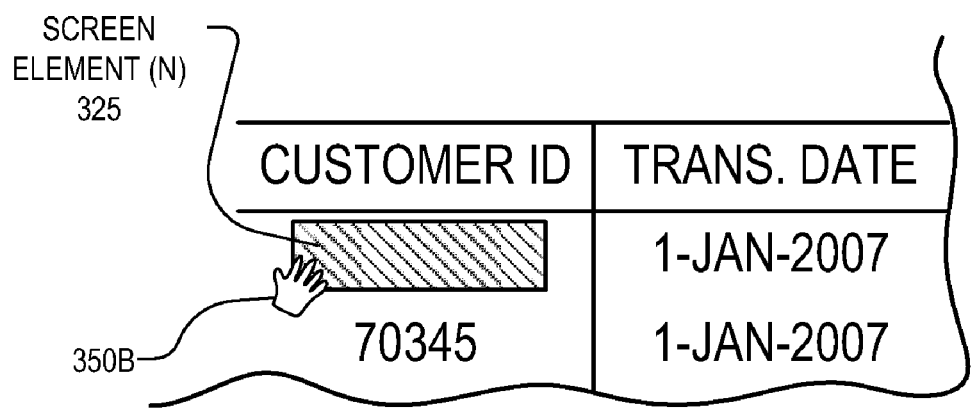
FIG. 8B is an illustration of a highlighted screen element at a get location, in accordance with an embodiment of the invention.

As discussed above, the reach and get function may exploit a highlight feature to increase usability and decrease user error. FIG. 8A is a functional block diagram illustrating a hilite s-machine 800 for highlighting screen elements, in accordance with an embodiment of the invention. Hilite s-machine 800 forms a rendering pathway 805 between trigger s-machine 210 and the screen element s-machine over which cursor 350A or 350B (collectively cursor 350) is currently rendered. In the example illustrated by FIG. 8B, cursor 350B (reaching hand) is currently rendered over screen element (N) 325. Therefore, FIG. 8A illustrates hilite s-machine 800 currently linked to screen element s-machine (N) 225 responsible for rendering screen element (N) 325.

Hilite s-machine 800 operates by making and breaking links with each screen element s-machines 225 corresponding to a screen element 325 over which cursor 350 passes. Upon making the link with screen element s-machine (N), the x-y coordinates, height, and width of screen element (N) are passed to hilite s-machine 800 from screen element s-machine (N). Hilite s-machine 800 then uses the x-y coordinates, height, and width to highlight screen element (N). In one embodiment, hilite s-machine 800 overlays a transparent or semitransparent grey box over screen element (N). Of course, other highlight formats or colors may be used by hilite s-machine 800.

In the illustrated embodiment, hilite s-machine 800 forms rendering pathway 805 directly between trigger s-machine 210 and hilite s-machine 800. Because hilite s-machine 800 links directly to trigger s-machine 210, instead of interface event s-machine 205, hilite s-machine 800 can receive screen update or render signals therefrom. As such, hilite s-machine 800 includes the functionality for rendering a highlight box over screen element (N). In an alternative embodiment, hilite s-machine 800 may couple directly to interface event s-machine 205, similar to a verb s-machine, and carry around its own rendering hierarchy for drawing the highlight box to display screen 300. In this alternative embodiment, as the user moves cursor 350 over various screen elements 325, hilite s-machine 800 would continuously plug-in and unplug its rendering hierarchy into the appropriate locations of hierarchical data structure 200.

As discussed above, the reach and get functions may also exploit a select feature when selecting screen elements 325. The select feature highlights screen elements 325 using a highlight format different from that used by hilite s-machine 800. However, the select feature requires that the user actively select a screen element 325 by clicking on it (e.g., left mouse click) before the highlighting format will change. Accordingly, when a user first navigates cursor 350 over a screen element 325, hilite s-machine 800 will accentuate the screen element 325 with a first highlight format (e.g., semitransparent grey shading). If the user clicks on the screen element 325, then the select feature will accentuate the screen element 325 with a second highlight format (e.g., bold outline, semitransparent cyan shading, etc.). The select feature provides the user with a visual cue that a screen element 325 has been selected.

Figure 9A:
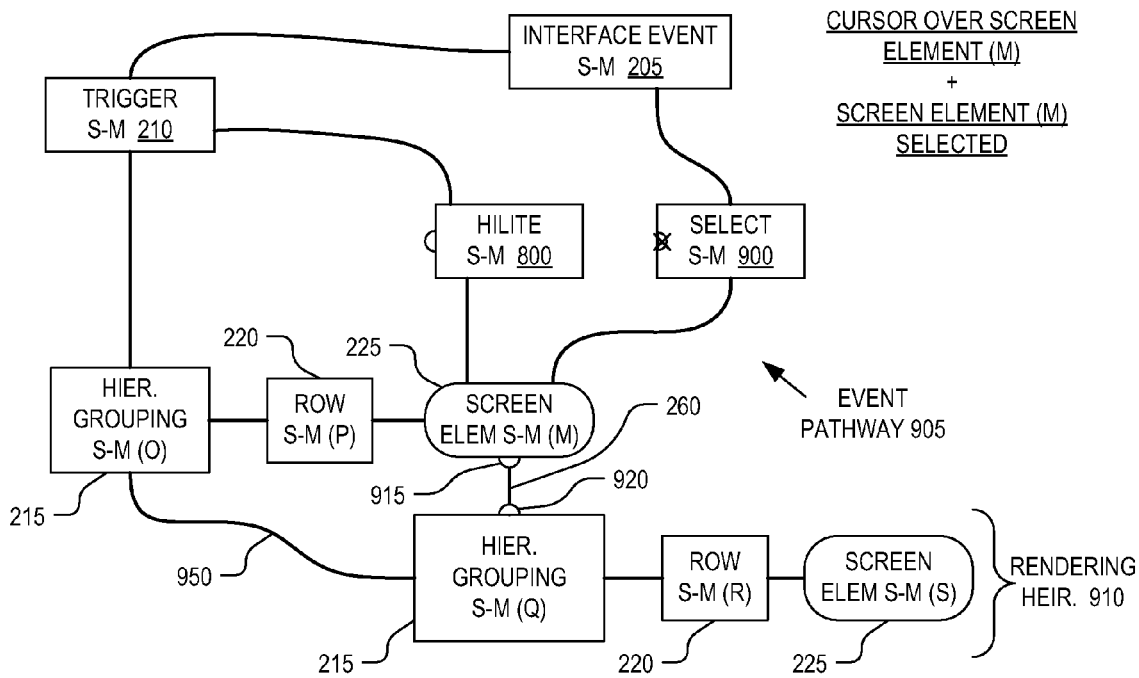
FIG. 9A is a functional block diagram illustrating an event pathway including a select s-machine for selecting and highlighting screen elements, in accordance with an embodiment of the invention.
Figure 9B:
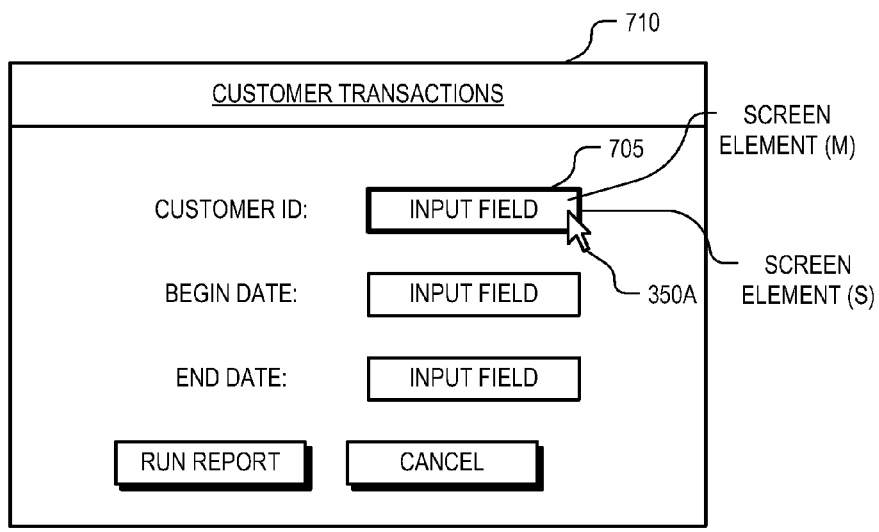
FIG. 9B is a block diagram illustrating a selected screen element, in accordance with an embodiment of the invention.

FIG. 9A is a functional block diagram illustrating a select s-machine 900 for accentuating selected screen elements, in accordance with an embodiment of the invention. Select s-machine 900 forms an event pathway 905 between interface event s-machine 205 and the screen element s-machine 225 corresponding to the screen element 325 over which cursor 350 is currently residing. In the illustrated embodiment of FIG. 9A, select s-machine 900 is linked to screen element s-machine (M), and therefore, cursor 350 is overlaying screen element (M) (see FIG. 9B).

In order to accentuate selected screen element (M), select s-machine 900 plugs in a rendering hierarchy 910 into the hierarchical data structure (e.g., hierarchical data structure 200) currently being used to render a display screen (e.g., display screen 300). The illustrated embodiment of rendering hierarchy 910 includes a hierarchical grouping s-machine (Q) 215, a row s-machine (R) 220, and a screen element s-machine (S) 225. Select s-machine 900 carries rendering hierarchy 910 around plugging it into screen element s-machines 225 at the appropriate rendering layers. In the illustrated embodiment of FIG. 9A, hierarchical grouping s-machine (Q) is plugged in below hierarchical grouping s-machine (O) so that screen element s-machine (S) is rendered at a rendering layer in front of screen element s-machine (M). Select s-machine 900 determines the screen coordinates (x, y, height, and width) of screen element (M) 325 from screen element s-machine (M) 225 and then uses these screen coordinates to position screen element (S) over screen element (M). In one embodiment, link 260 between screen element s-machine (M) and hierarchical grouping s-machine (Q) is formed when select s-machine 900 links to screen element s-machine (M), determines the key associated with binding site 915, and then alters the key associated with binding site 920 to match (e.g., complementary value). Upon generating a key pair between binding sites 915 and 920 of screen element s-machine (M) and hierarchical grouping s-machine (Q), the two entities will automatically link together. Similarly, a link 950 is formed between hierarchical grouping s-machines (Q) and (O), so that hierarchical grouping s-machine (Q) receives the render signal. In response to the render signal, row s-machine (R) renders with the effect of accentuating screen element (M) with screen element (S).

Figure 10A:
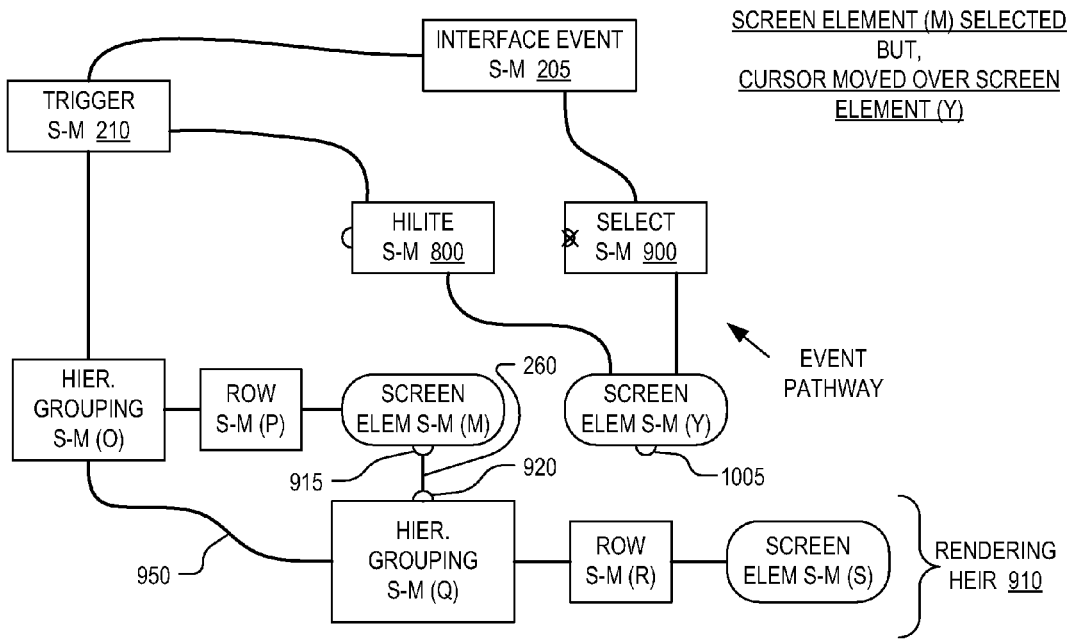
FIG. 10A is a functional block diagram illustrating an event pathway including a select s-machine for selecting and highlighting screen elements, in accordance with an embodiment of the invention.
Figure 10B:
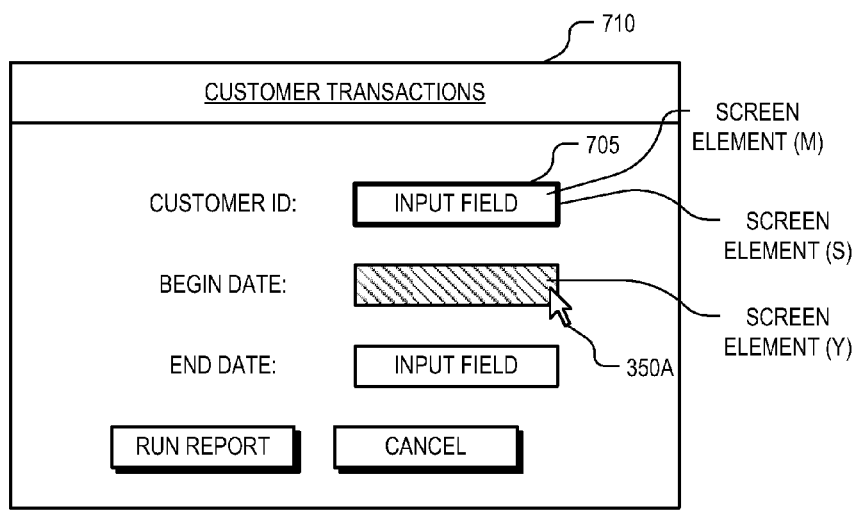
FIG. 10B is a block diagram illustrating different screen elements that are simultaneously highlighted and selected, in accordance with an embodiment of the invention.

FIGS. 10A and 10B illustrate how one screen element may remain selected, while another screen element is highlighted, in accordance with an embodiment of the invention. FIG. 10B is a block diagram illustrating that screen element (M)

remains selected and accentuated by screen element (S) even though the user has moved mouse cursor 350A over an another input field represented by screen element (Y), which is thus highlighted by hilite s-machine 800.

FIG. 10A is a functional block diagram illustrating how the pertinent s-machines self-organize to render a portion of dialog box 710 in FIG. 10B. Upon moving mouse cursor 350A over screen element (Y), hilite s-machine 800 immediately links to screen element s-machine (Y) and highlights screen element (Y) with a highlighting format. Similarly, select s-machine 900 immediately links to screen element s-machine (Y), as well. However, because the user has not yet "clicked" or selected screen element (Y), rendering hierarchy 910 remains plugged into screen element s-machine (M). Screen element (S) continues to accentuate screen element (M) to indicate that screen element (M) is still selected and will remain so until the user clicks on another screen element. If the user were to select screen element (Y), select s-machine 900 would unplug rendering hierarchy 910 from screen element s-machine (M) and plug it into screen element s-machine (Y) by changing the key of binding site 920 to match binding site 1005. Hierarchical grouping s-machine (Q) also binds to the hierarchical grouping s-machine associated with screen element s-machine (Y). In the illustrated example of FIG. 10A, it turns out that it would be the same hierarchical grouping s-machine (O), but in practice, hierarchical grouping s-machine (Q) is unplugged both from the current screen element s-machine and the hierarchical grouping s-machine corresponding to the current screen element s-machine, then linked to the new screen element s-machine and its corresponding hierarchical grouping s-machine.

Figure 11:
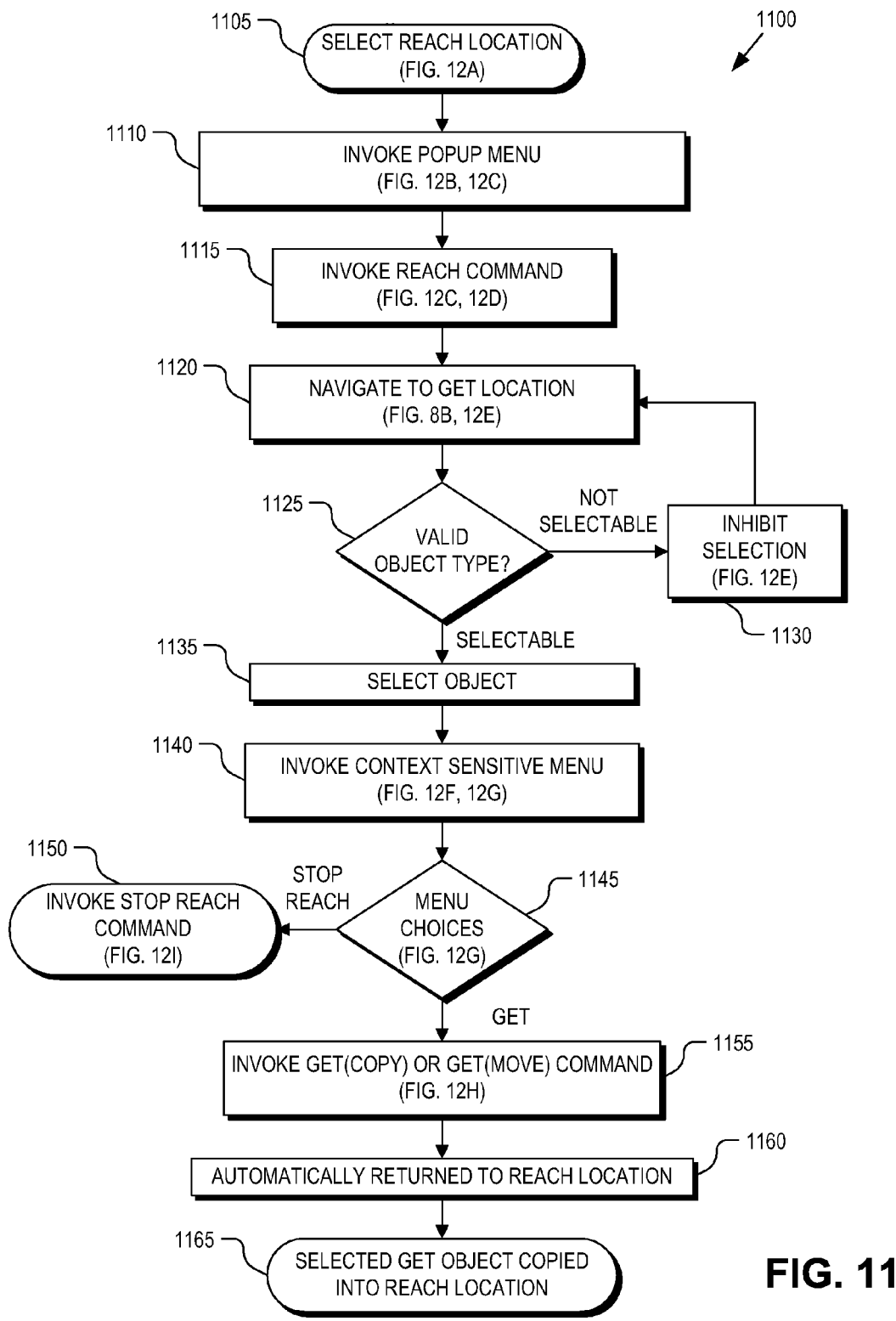
FIG. 11 is a flow chart illustrating a process to reach and get objects using s-machines, in accordance with an embodiment of the invention.

FIG. 11 is a flow chart illustrating a process 1100 to reach and get objects using self-organizing s-machines, in accordance with an embodiment of the invention. Although FIG. 11 illustrates implementation of the reach and get functions for getting a single object, it should be appreciated that process 1100 and the s-machines illustrated in FIGS. 12A-I, may be adapted to implement the multi-get function discussed in connection with process 600 of FIG. 6.

Figure 12A:
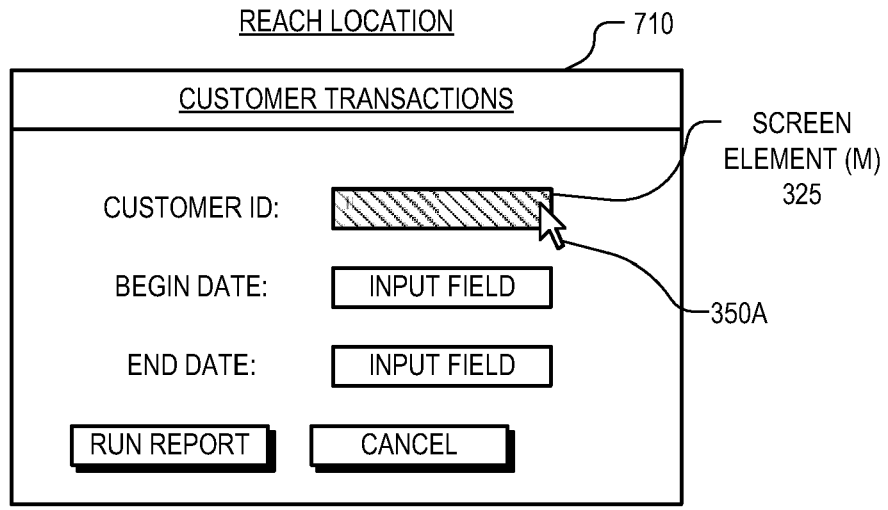
FIG. 12A is an illustration of a highlighted reach location, in accordance with an embodiment of the invention.
Figure 12B:
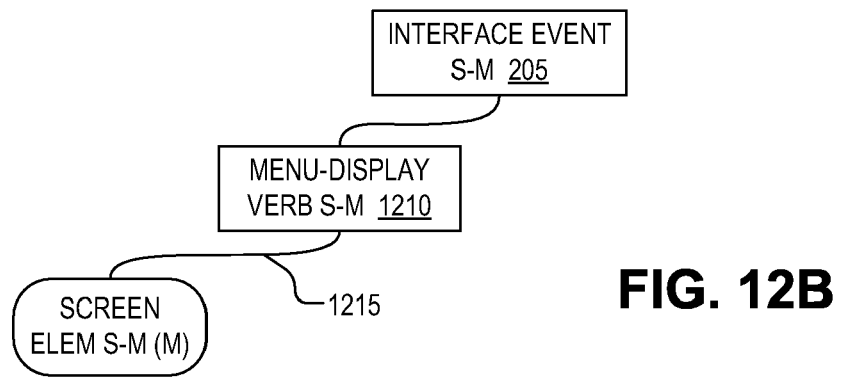
FIG. 12B is a functional block diagram illustrating an event pathway including a menu-display verb s-machine for displaying a popup menu at a reach location, in accordance with an embodiment of the invention.

In a process block 1105, the user selects a reach location. FIG. 12A illustrates the reach location as input field 705 of dialog box 710. Again, screen element (M) 325 generated by screen element s-machine (M) 225 represents input field 705 and the reach location.

Figure 12C:
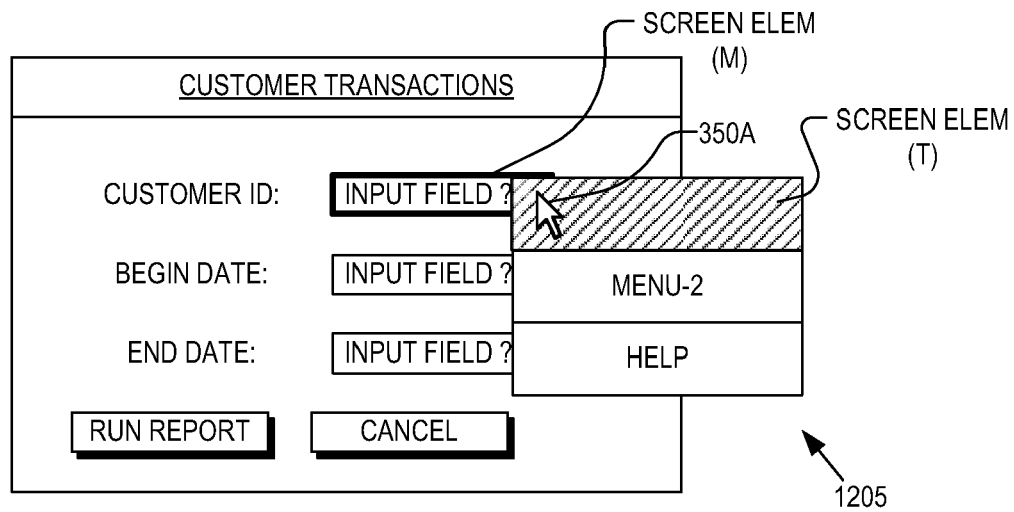
FIG. 12C is an illustration of a selected reach location and a popup menu for invoking a reach command, in accordance with an embodiment of the invention.
Figure 12D:
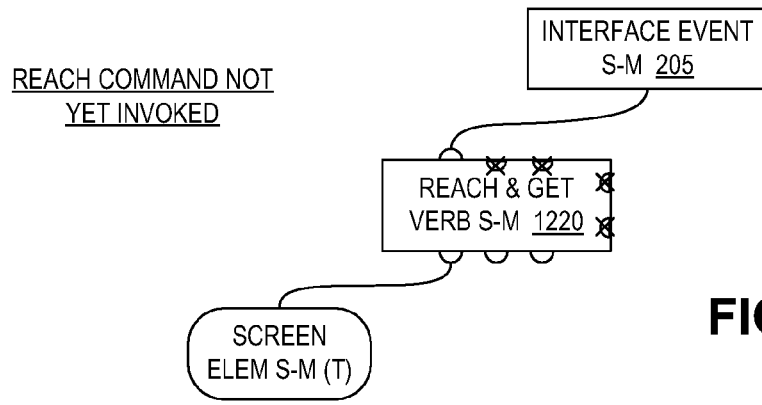
FIG. 12D is a functional block diagram illustrating an event pathway including a reach and get verb s-machine for reaching and getting objects within a computing environment, in accordance with an embodiment of the invention.

In a process block 1110, the user invokes a popup menu on the reach location to gain access to the reach command. In one embodiment, the popup menu is invoked via a right mouse click. FIG. 12C illustrates an example popup menu 1205 that is generated by a menu-display verb s-machine 1210 (see FIG. 12B). When the user moves cursor 350A over screen element (M), screen element (M) publishes a binding site that will form link 1215 with menu-display verb s-machine 1210. In one embodiment, there may be a multiple different menu-display verb s-machines 1210 each for generating a different context sensitive popup menu. In this embodiment, screen element s-machines 225 may publish binding sites having different key values for binding to the appropriate menu-display verb s-machine 1210 depending upon the context of the particular screen element 325.

As with other screen objects, popup menu 1205 may be rendered with a hierarchical data structure that plugs into an existing hierarchical data structure. In the illustrated embodiment of FIG. 12C, the reach command may be invoked by selecting screen element (T). It is noteworthy, that prior to invoking the reach command, but while cursor 350A is hovering over screen element (T), hilite s-machine 800 highlights screen element (T), while select s-machine 900 continues to accentuate screen element (M).

In a process block 1115, the user may invoke the reach command by selecting the reach command from within popup menu 1205. In one embodiment, the reach command may be invoked via a key stroke combination, as well. Upon invoking the reach command, the computing environment enters the reach mode (or smart reach mode) and a reach and get verb s-machine 1220 (see FIG. 12D) plugs itself into an event pathway between interface event s-machine 205 and screen element s-machine (T).

Once the reach mode is activated, the pointer cursor 350A changes to a reaching hand cursor 350B and the user can navigate to the get location (process block 1120) to reach for the desired object. In addition to generating popup menu 1205, menu-display verb s-machine 1210 also stores the reach location to a known memory location. Subsequently, reach and get verb s-machine 1220 can refer to the known memory location storing the reach location in order to automatically navigate back to the reach location upon invocation of the get command. In this manner, the user can navigate to entirely different virtual books, documents, or application, and still be automatically returned to the reach location upon completion of the reach and get actions.

Figure 12E:
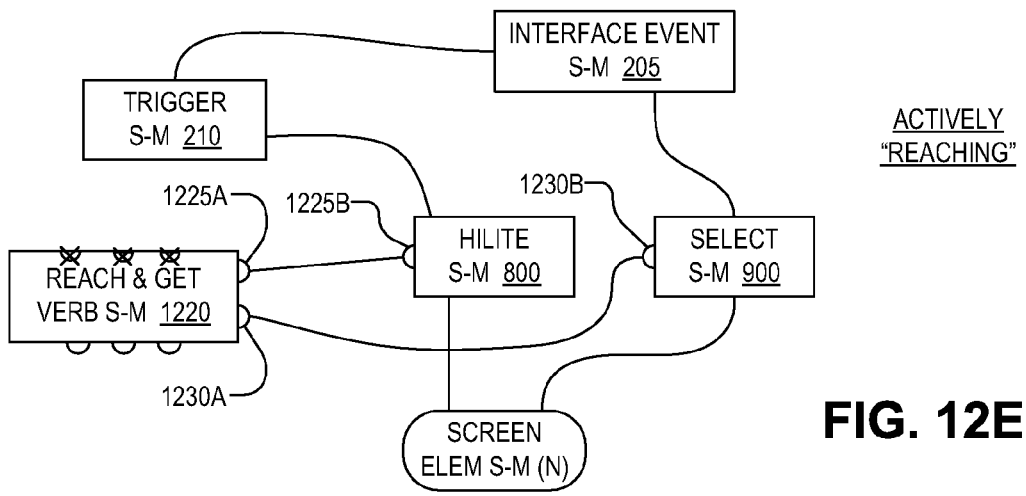
FIG. 12E is a functional block diagram illustrating links between s-machines during a reaching mode, in accordance with an embodiment of the invention.
Figure 12F:
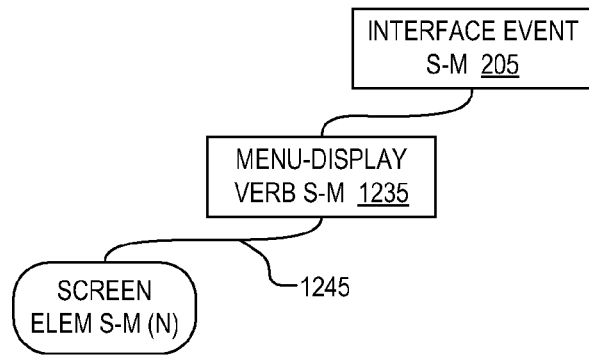
FIG. 12F is a functional block diagram illustrating an event pathway including a menu-display verb s-machine for displaying a popup menu at a get location, in accordance with an embodiment of the invention.

Additionally, when actively reaching, reach and get verb s-machine 1220 exposes inhibitor sites 1225A and 1230A for linking to corresponding inhibitor sites 1225B and 1230B on hilite s-machine 800 and select s-machine 900, respectively (see FIG. 12E). Inhibitor sites 1225A and 1230A facilitate the smart reach feature discussed above. When the user moves cursor 350B over an object, reach and get verb s-machine 1220 determines whether the object has a data type category that is permissible to copy into the reach location (decision block 1125). If the data type category is an invalid match, then reach and get verb s-machine 1220 issues inhibit signals to one or both of hilite s-machine 800 and select s-machine 900 to inhibit highlighting and selecting the particular object. If the data type category is a valid match, then hilite s-machine 800 and select s-machine 900 are permitted to highlight and select the particular object (process block 1135).

Figure 12G:
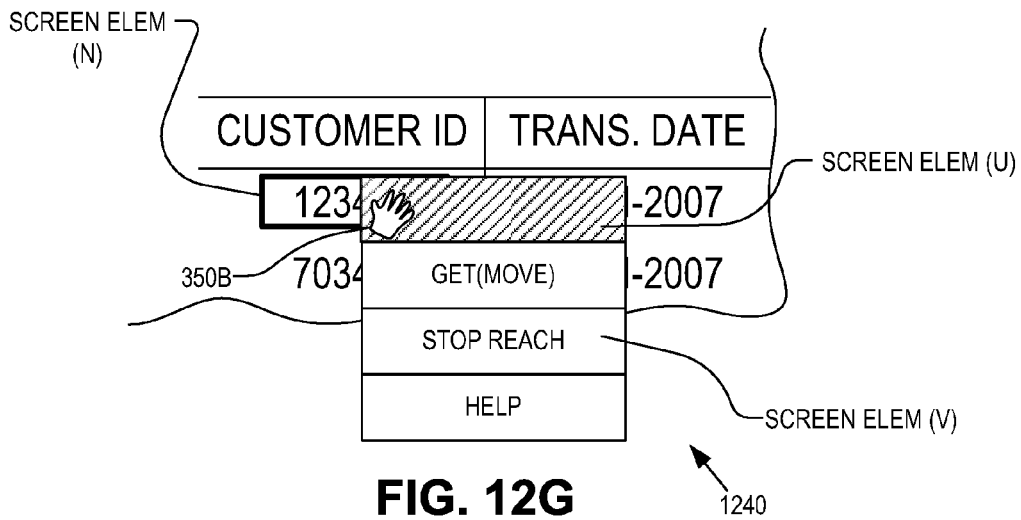
FIG. 12G is an illustration of a selected object at a get location and a popup menu for invoking a get command, in accordance with an embodiment of the invention.

Once the object (or objects) to be grabbed are selected, the user can invoke a popup menu to gain access to the get command (process block 1140). In one embodiment, the popup menu is invoked via a right mouse click. FIG. 12G illustrates an example popup menu 1240 that is generated by a menu-display verb s-machine 1235 (see FIG. 12F). When the user moves cursor 350B over screen element (N), screen element (N) publishes a binding site that will form link 1245 with menu-display verb s-machine 1235. In one embodiment, there may be a multiple different menu-display verb s-machines 1235 each for generating a different context sensitive popup menu. In another embodiment, each menu display verb s-machine (e.g., 1210 and 1235) has two popup menu hierarchies associated with it for rendering popup menus. If the computing environment is not in the reach mode, it pops up a standard menu (e.g., popup menu 1205). If the computing environment is in the reach mode, it pops up a Get menu (e.g., popup menu 1240).

Figure 12H:
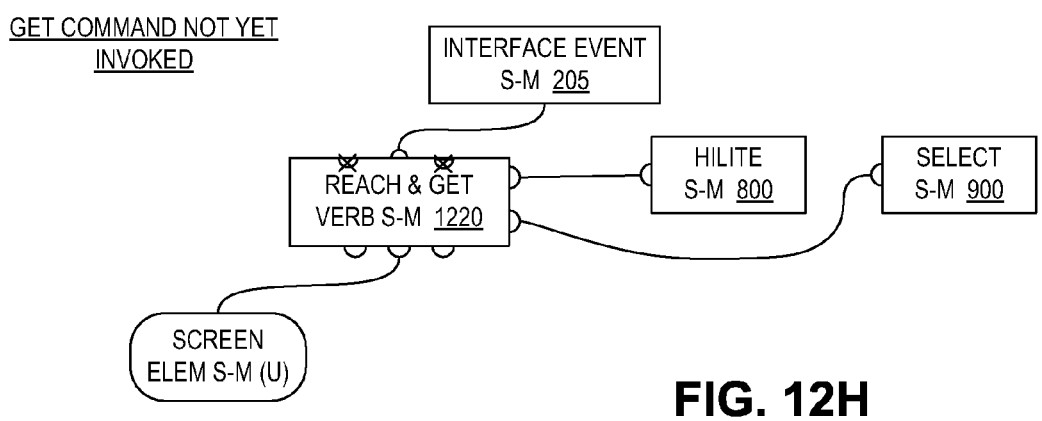
FIG. 12H is a functional block diagram illustrating links between s-machines during a reaching mode just prior to invoking a get command, in accordance with an embodiment of the invention.
Figure 12I:
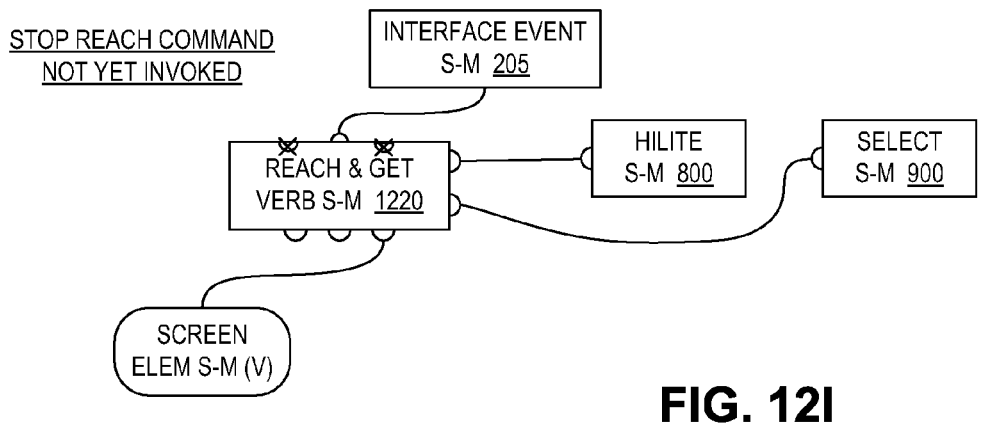
FIG. 12I is a functional block diagram illustrating links between s-machines during a reaching mode just prior to invoking a stop reach command, in accordance with an embodiment of the invention.

As with other screen objects, popup menu 1240 may be rendered with a hierarchical data structure that plugs into an existing hierarchical data structure. In the illustrated embodiment popup menu 1240 provides several choices (decision block 1145), including a get(copy) function, a get(move) function, a stop reach function, and a help function. If the user selects the stop reach function (process block 1150), the computing environment exits the reach mode and leaves the user at the get location, rather than returning to the reach location. FIG. 12I is a functional block diagram illustrating how the reach and get verb s-machine 1220 links to screen element s-machine (V) corresponding to the stop reach command in popup menu 1240.

Alternatively, the user can invoke one of the get functions on the selected object (process block 1155). The get(copy) function is similar to a copy and paste in that the object at the get location is merely copied to the reach location. The get (move) is similar to a cut and paste in that the object is moved to the reach location and removed from the get location. FIG. 12H is a functional block diagram illustrating how reach and get verb s-machine 1220 links to screen element s-machine (U) corresponding to the get(copy) command in popup menu 1240. In one embodiment, if no selection has been made and the user invokes the popup menu, an error message is displayed over or near the get menu items indicating that a selection must be made prior to clicking the get menu item. In this situation, clicks on the get menu item (or the equivalent key stroke combination) are ignored until a valid selection is made. It should be appreciated that the get(copy), get(move), and stop reach functions may all be invoked via key stroke combinations, as well as, from popup menu 1240. Alternatively, a double click at the get location could automatically invoke a default get behavior (e.g., get(copy)).

Once one of the get commands has been invoked, the computing system exits the reach mode, automatically returns the user to the reach location (process block 1160) and copies the object into the reach location (process block 1165). Returning the user to the reach location may include navigating back to the program, book, dialog box, etc. of the reach location, transforming reaching hand cursor 350B back to the pointing cursor 350A, and returning cursor 350A to the reach location. In one embodiment, reach and get verb s-machine 1220 is able to return to the reach location by accessing the known memory location used by menu-display verb s-machine 1210 to store the reach location (e.g., stores memory address of screen element s-machine (M)). Subsequently, when reach and get verb s-machine 1220 is ready to navigate back to the reach location, it can reference the known memory location to determine the screen element s-machine 225 containing the reach location.

In one embodiment, the computing environment may include a plurality of reach and get verb s-machines 1220 each tailored for reaching and getting objects of different data type categories. Some of these reach and get verb s-machines may also perform additional functions prior to copying the object into the reach location. For example, some reach and get verb s-machines 1220 may format text strings into a specified font, may convert measurements from imperial to metric (or visa versa), convert decimal values into fractions, or otherwise.

Figure 13:
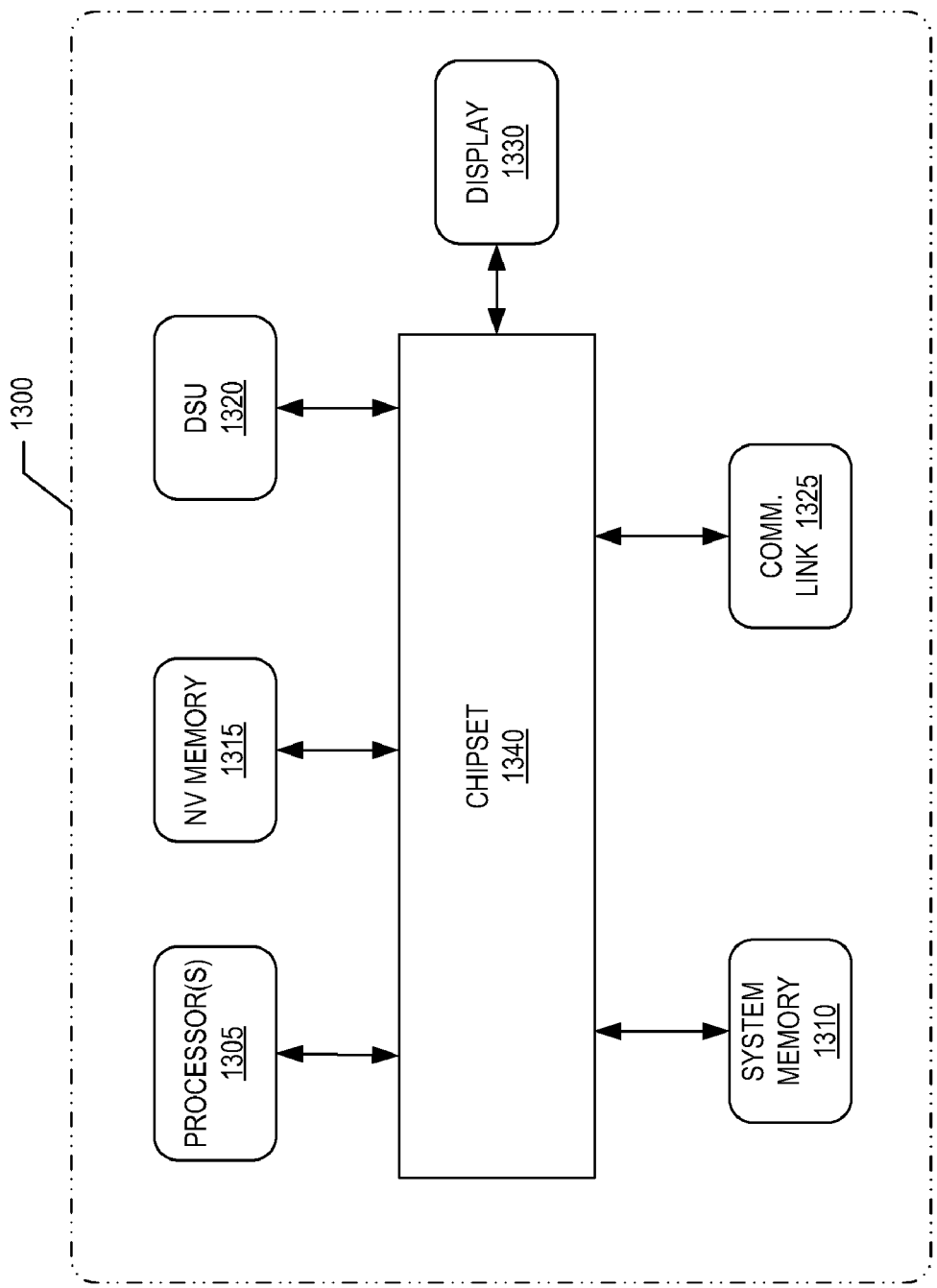
FIG. 13 is a block diagram illustrating a demonstrative processing system to execute embodiments of the invention thereon.

FIG. 13 is a block diagram illustrating a demonstrative processing system 1300 for executing embodiments of the invention described above. The illustrated embodiment of processing system 1300 includes one or more processors (or central processing units) 1305, system memory 1310, nonvolatile ("NV") memory 1315, a data storage unit ("DSU") 1320, a communication link 1325, a display 1330, and a chipset 1340. The illustrated processing system 1300 may represent any computing system including a desktop computer, a notebook computer, a workstation, a handheld computer, a server, a blade, or the like.

The elements of processing system 1300 are interconnected as follows. Processor(s) 1305 is communicatively coupled to system memory 1310, NV memory 1315, DSU 1320, and communication link 1325, via chipset 1340 to send and to receive instructions or data thereto/therefrom. In one embodiment, NV memory 1315 is a flash memory device. In other embodiments, NV memory 1315 includes any one of read only memory ("ROM"), programmable ROM, erasable programmable ROM, electrically erasable programmable ROM, or the like. In one embodiment, system memory 1410 includes random access memory ("RAM"), such as dynamic RAM ("DRAM"), synchronous DRAM ("SDRAM"), double data rate SDRAM ("DDR SDRAM"), static RAM ("SRAM"), or the like. DSU 1320 represents any storage device for software data, applications, and/or operating systems, but will most typically be a nonvolatile storage device. DSU 1320 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1320 is illustrated as internal to processing system 1300, DSU 1320 may be externally coupled to processing system 1300. Communication link 1325 may couple processing system 1300 to a network such that processing system 1300 may communicate over the network with one or more other computers. Communication link 1325 may include a modem, an Ethernet card, a Gigabit Ethernet card, Universal Serial Bus ("USB") port, a wireless network interface card, a fiber optic interface, or the like. Display unit 1330 may be coupled to chipset 1340 via a graphics card and renders images for viewing by a user.

It should be appreciated that various other elements of processing system 1300 may have been excluded from FIG. 13 and this discussion for the purposes of clarity. Chipset 1340 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1340. Correspondingly, processing system 1300 may operate without one or more of the elements illustrated. For example, processing system 1300 need not include DSU 1320.

The processes explained above are described in terms of computer software and hardware. The techniques described may constitute computer-executable instructions embodied within a computer readable medium, that when executed by a computer will cause the computer to perform the operations described. Additionally, the processes may be embodied within hardware, such as an application specific integrated circuit ("ASIC") or the like.

A computer-accessible medium includes any mechanism that provides (i.e., stores and/or transmits) information in a form accessible by a physical machine (e.g., a computer, network device, personal digital assistant, manufacturing tool, any device with a set of one or more processors, etc.). For example, a computer-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
    invoking a reach command from a reach location within a computing environment;
    navigating to an object within the computing environment under control of a user;
    invoking a get command upon the object;
    automatically navigating back to the reach location in response to invoking the get command; and
    automatically copying the object into the reach location in response to invoking the get command.

2. The method of claim 1, wherein invoking the reach command from the reach location comprises:
    invoking a popup menu while a cursor is located at the reach location; and
    selecting the reach command from within the popup menu.

3. The method of claim 1, wherein invoking the reach command from the reach location comprises pressing a key stroke combination while a cursor is located at the reach location.

4. The method of claim 1, wherein invoking the get command upon the object comprises:
    selecting the object;
    invoking a popup menu while the object is selected; and
    selecting the get command from within the popup menu.

5. The method of claim 4, wherein the object comprises a second object, the method further comprising:
    navigating to a first object within the computing environment prior to navigating to the second object; and
    inhibiting the first object from being selected if a first data type category of the first object does not match a second data type category of the reach location.

6. The method of claim 5, wherein inhibiting the first object from being selected comprises:
    preventing the first object from being highlighted when a cursor is placed over the first object or when the cursor is placed over the first object and the user clicks on the first object.

7. The method of claim 1, further comprising:
    determining whether a data type category of the object is permissible to copy into the reach location; and
    inhibiting invocation of the get command upon the object if the data type category of the object is not permissible to copy into the reach location.

8. The method of claim 1, wherein the object comprises at least one of alphabetical data, numerical data, alphanumeric data, a table, a plot, or an image.

9. The method of claim 1, wherein navigating to the object within the computing environment under control of the user comprises:
    moving a cursor over the object;
    accentuating the object with a first highlighting format upon moving the cursor over the object; and
    accentuating the object with a second highlighting format upon selecting the object with the mouse cursor.

10. The method of claim 1, further comprising:
    navigating to a plurality of objects within the computing environment under control of the user;
    selecting the plurality of objects, wherein invoking the get command upon the object comprises invoking the get command upon the plurality of objects selected; and
    automatically copying the plurality of objects into the reach location in response to invoking the get command.

11. The method of claim 1, further comprising changing a cursor from a first graphic type to a second graphic type upon invoking the reach command.

12. A tangible machine-accessible medium that provides instructions that, if executed by a machine, will cause the machine to perform operations comprising:
    storing a first location of a cursor within a computing environment as a reach location;
    enabling a user to navigate from the reach location to a get location within the computing environment at which an object is located;
    enabling a get command, upon selection of the object;
    automatically navigating back to the reach location in response to an invocation of the get command; and
    copying the object into the reach location in response to the invocation of the get command.

13. The tangible machine-accessible medium of claim 12 wherein copying the object into the reach location in response to the invocation of the get command comprises automatically copying the object into the reach location in response to the invocation of the get command from the get location.

14. The tangible machine-accessible medium of claim 12, further providing instructions that, if executed by the machine, will cause the machine to perform further operations, comprising:
    entering the computing environment into a reach mode in response to a reach command invoked by the user when the cursor is located at the reach location; and
    exiting the computing environment from the reach mode in response to the invocation of the get command.

15. The tangible machine-accessible medium of claim 14, wherein entering the computing environment into the reach mode comprises:
    invoking a popup menu while the cursor is located at the reach location; and invoking the reach command in response to selection of the reach command from within the popup menu.

16. The tangible machine-accessible medium of claim 14, wherein entering the computing environment into the reach mode comprises invoking the reach command in response to a key stroke combination.

17. The tangible machine-accessible medium of claim 12, wherein automatically navigating back to the reach location in response to the invocation of the get command comprises:
    re-rendering a screen region including the reach location to a foreground of the computing environment; and
    returning the cursor to the reach location.

18. The tangible machine-accessible medium of claim 12, wherein enabling the get command upon selection of the object comprises:
    determining whether a data type category of the object is permissible to copy into the reach location;
    enabling the get command if the data type category is determined to be permissible to copy into the reach location; and
    inhibiting the get command if the data type category is not determined to be permissible to copy into the reach location.

19. The tangible machine-accessible medium of claim 18, wherein enabling the get command upon selection of the object comprises enabling selection of the object, if the data type category is determined to be permissible to copy into the reach location, the tangible machine-accessible medium providing further instructions that, if executed by the machine, will cause the machine to perform further operations, comprising:

inhibiting selection of the object if the data type category is not determined to be permissible to copy into the reach location.

20. The tangible machine-accessible medium of claim 12, wherein enabling the user to navigate from the reach location to the get location comprises:
   moving the cursor over the object;
   accentuating the object with a first highlighting format upon moving the cursor over the object; and
   accentuating the object with a second highlighting format upon the selection of the object with the cursor.

21. The tangible machine-accessible medium of claim 12, wherein the object comprises at least one of alphabetical data, numerical data, alphanumeric data, a table, a plot, or an image.

22. A system including at least one processor and a tangible computer readable medium, the tangible computer readable medium containing a data structure for execution by the at least one processor, the data structure comprising:
   an interface event entity to detect user inputs;
   a first screen element entity to render a first screen element to a screen;
   a reach and get entity to link to the interface event entity and enter a reach mode when a user invokes a reach command to reach for an object to copy into the first screen element; and
   a second screen element entity to render the object to the screen, wherein the reach and get entity copies the object from the second screen element entity to the first screen element entity when the user invokes a get command upon the object.

23. The system of claim 22, wherein the data structure further comprises:
   a select entity to link to the second screen element entity and the interface event entity when the user navigates a cursor over the object; and
   a rendering hierarchy to link to the second screen element and to accentuate the second screen element with a first highlight format when the user clicks on the object.

24. The system of claim 23, wherein the data structure further comprises:
   a trigger entity linked to the interface event entity to issue render commands; and a hilite entity to link to the trigger entity and to the second screen element entity when the user navigates the cursor over the object, the hilite entity to highlight the object with a second highlight format in response to the cursor residing over the object.

25. The system of claim 24, wherein the select entity links to the reach and get entity when the reach and get entity enters the reach mode, the reach and get entity to inhibit the select entity from selecting and accentuating the object if a data type category of the object is not permissible to copy to the first screen element entity.

26. The system of claim 25, wherein the hilite entity links to the reach and get entity when the reach and get entity enters the reach mode, the reach and get entity to inhibit the hilite entity from highlighting the object if the data type category of the object is not permissible to copy to the first screen element entity.

27. The system of claim 22, wherein the data structure further comprises:
   a menu-display entity to link between the interface event entity and the first screen element entity to display a context sensitive popup menu, wherein the reach command is invoked from within the context sensitive popup menu.

28. The system of claim 27, wherein the data structure further comprises a third screen element entity to display a menu element within the context sensitive popup menu from which the reach command is invoked, wherein the reach and get entity links to the third screen element entity when the user positions a cursor over the menu element.

29. The system of claim 27, wherein the menu-display entity stores a location of the first screen element entity to a known memory location for access by the reach and get entity and wherein the reach and get entity automatically returns a cursor to the first screen element with reference to the known memory location in response to invocation of the get command on the object.

30. The system of claim 22, wherein the reach and get entity, the interface event entity, the first screen element entity, and the second screen element entity comprise software entities that self-assemble during execution by linking binding sites having key values that correspond.

* * * * *